US012750889B2

(12) United States Patent
Shah et al.

(10) Patent No.: US 12,750,889 B2
(45) Date of Patent: Sep. 29, 2026

(54) USER EQUIPMENT, SCHEDULING NODE, METHOD FOR USER EQUIPMENT, AND METHOD FOR SCHEDULING NODE

(71) Applicant: Panasonic Intellectual Property Corporation of America, Torrance, CA (US)

(72) Inventors: Rikin Shah, Langen (DE); Hidetoshi Suzuki, Kanagawa (JP); Ming-Hung Tao, Frankfurt am Main (DE)

(73) Assignee: Panasonic Intellectual Property Corporation of America, Torrance, CA (US)

(*) Notice: Subject to any disclaimer, the term of this patent is extended or adjusted under 35 U.S.C. 154(b) by 341 days.

(21) Appl. No.: 18/552,875

(22) PCT Filed: Mar. 28, 2022

(86) PCT No.: PCT/EP2022/058049
§ 371 (c)(1),
(2) Date: Sep. 27, 2023

(87) PCT Pub. No.: WO2022/207527
PCT Pub. Date: Oct. 6, 2022

(65) Prior Publication Data

US 2024/0196444 A1 Jun. 13, 2024

(30) Foreign Application Priority Data

Mar. 31, 2021 (EP) .................................... 21166342
Sep. 28, 2021 (EP) .................................... 21199586

(51) Int. Cl.
*H04W 74/0833* (2024.01)
*H04W 36/08* (2009.01)
*H04W 74/00* (2009.01)

(52) U.S. Cl.
CPC ..... *H04W 74/0833* (2013.01); *H04W 74/004* (2013.01); *H04W 36/08* (2013.01)

(58) Field of Classification Search
CPC ........... H04W 74/0833; H04W 74/004; H04W 36/08; H04W 74/0816; H04W 76/27; H04W 28/0278; H04W 74/002
See application file for complete search history.

(56) References Cited

U.S. PATENT DOCUMENTS

2010/0272046 A1* 10/2010 Guo ..................... H04W 72/21 370/329
2013/0107722 A1* 5/2013 Huang ................. H04W 72/51 370/241

(Continued)

FOREIGN PATENT DOCUMENTS

WO WO 2019217829 A1 11/2019
WO 2020067757 A1 4/2020
WO 2020067790 A1 4/2020

OTHER PUBLICATIONS

Qualcomm "Remaining issues on control plane aspects of NR small data transmission", 3GPP R2-2101223, Jan. 25-Feb. 5, 2020 (Year: 2020).*

(Continued)

*Primary Examiner* — Chuong M Nguyen
(74) *Attorney, Agent, or Firm* — Seed Intellectual Property Law Group LLP

(57) ABSTRACT

A user equipment (UE) includes a transceiver and circuitry. The circuitry detects, while in a procedure for transmitting first data in an inactive state, that second data are to be transmitted in a connected state, and determines whether or not there is a transmission opportunity to wait for. When it is determined that there is no transmission opportunity to wait for or the transmission opportunity to wait for is no longer expected to occur, the circuitry initiates a random (Continued)

access channel (RACH) procedure for entering a connected state. When, on the other hand, it is determined that there is the transmission opportunity to wait for and the transmission opportunity occurs, the circuitry controls the transceiver to transmit, using the transmission opportunity, a traffic indication indicating the detection of the second data.

14 Claims, 15 Drawing Sheets

(56) References Cited

U.S. PATENT DOCUMENTS

2021/0410181 A1* 12/2021 Jeon .................. H04W 52/0258
2022/0015132 A1* 1/2022 Sharma ............... H04W 72/044

OTHER PUBLICATIONS

3GPP, "3rd Generation Partnership Project; Technical Specification Group Radio Access Network; NR; Medium Access Control (MAC) protocol specification (Release 15)," 3GPP TS 38.321 V15.8.0, Dec. 2019. (78 pages).
3GPP, "3rd Generation Partnership Project; Technical Specification Group Radio Access Network; NR; Medium Access Control (MAC) protocol specification (Release 16)," 3GPP TS 38.321 v16.1.0, Jul. 2020. (151 pages).
3GPP, "3rd Generation Partnership Project; Technical Specification Group Radio Access Network; NR; Multiplexing and channel coding (Release 15)," 3GPP TS 38.212 V15.6.0, Jun. 2019. (101 pages).
3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).
3GPP, "3rd Generation Partnership Project; Technical Specification Group Radio Access Network; NR; Physical channels and modulation (Release 15)," 3GPP TS 38.211 V15.6.0, Jun. 2019. (97 pages).
3GPP, "3rd Generation Partnership Project; Technical Specification Group Radio Access Network; NR; Physical channels and modulation (Release 15)," 3GPP TS 38.211 V15.7.0, Sep. 2019. (97 pages).
3GPP, "3rd Generation Partnership Project; Technical Specification Group Radio Access Network; NR; Physical channels and modulation (Release 16)," 3GPP TS 38.211 V16.2.0, Jun. 2020. (131 pages).
3GPP, "3rd Generation Partnership Project; Technical Specification Group Radio Access Network; NR; Radio Resource Control (RRC) protocol specification (Release 15)," 3GPP TS 38.331 V15.8.0, Dec. 2019. (532 pages).
3GPP, "3rd Generation Partnership Project; Technical Specification Group Radio Access Network; NR; Radio Resource Control (RRC) protocol specification (Release 15)," 3GPP TS 38.331 V15.12.0, Dec. 2020. (541 pages).
3GPP, "3rd Generation Partnership Project; Technical Specification Group Radio Access Network; NR; Radio Resource Control (RRC) protocol specification (Release 16)," 3GPP TS 38.331 V16.1.0, Jul. 2020. (906 pages).
3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).
3GPP, "3rd Generation Partnership Project; Technical Specification Group Services and System Aspects; System Architecture for the 5G System; Stage 2 (Release 16)," 3GPP TS 23.501 v16.1.0, Jun. 2019. (368 pages).
Apple, "Non-SDB handling during the SDT procedure," R2-2101370, Agenda Item: 8.6.2, 3GPP TSG-RAN WG2 Meeting #113-e, E-meeting, Jan. 25-Feb. 5, 2021. (3 pages).
Asia Pacific Telecom, FGI, "CG-SDT based on beam operation," R2-2103265, Agenda item: 8.6.5, 3GPP TSG-RAN WG2 Meeting #113 bis electronic, Online, Apr. 12-20, 2021. (5 pages).
Extended European Search Report, dated Mar. 21, 2022, for European Patent Application No. 21199586.5-1212. (16 pages).
Extended European Search Report, dated Sep. 22, 2021, for European Patent Application No. 21166342.2-1212. (16 pages).
FGI, Asia Pacific Telecom, "Switching during a SDT procedure," R2-2107464, Agenda item: 8.6.2, 3GPP TSG-RAN WG2 Meeting #115 electronic, Online, Aug. 16-27, 2021. (5 pages).
Huawei, HiSilicon, "User plane common aspects for SDT," R2-2101183, Agenda item: 8.6.2, 3GPP TSG-RAN WG2 #113-e, E-meeting, Jan. 25-Feb. 5, 2021. (8 pages).
International Search Report, mailed Jul. 1, 2022, for PCT Patent Application No. PCT/EP2022/058049. (5 pages).
ITL, "Handling of the subsequent data," R2-2101867, Agenda item: 8.6.3, 3GPP TSG-RAN WG2 Meeting #113 electronic, Online, Jan. 25-Feb. 5, 2021. (2 pages).
ITU, "IMT Vision—Framework and overall objectives of the future development of IMT for 2020 and beyond," Recommendation ITU-R M.2083-0, Sep. 2015. (21 pages).
MediaTek Inc., "Subsequent Transmission of Small data in Inactive," R2-2006830, Agenda Item: 8.6.2, 3GPP TSG-RAN WG2 Meeting #111 electronic, Online, Aug. 17-28, 2020. (5 pages).
MediaTek Inc., "Subsequent Transmission of Small data in Inactive," R2-2101146, Agenda Item: 8.6.3, 3GPP TSG-RAN WG2 #113-e, E-Meeting, Jan. 23-Feb. 5, 2021. (4 pages).
Panasonic, "Discussion on beam selection aspect for CG-SDT," R2-2107788, Agenda item: 8.6.5, 3GPP TSG-RAN WG2 Meeting #115 electronic, Online, Aug. 16-27, 2021. (2 pages).
Qualcomm Incorporated, "Remaining issues on control plane aspects of NR small data transmission," R2-2101223, Agenda item: 8.6.3, 3GPP TSG-RAN WG2 Meeting #113e, Online, Jan. 25-Feb. 5, 2020. (7 pages).
Qualcomm Incorporated, "UP common aspects of SDT," R2-2107991, Agenda item: 8.6.2, 3GPP TSG-RAN WG2 Meeting #115 electronic, Online, Aug. 16-27, 2021. (4 pages).
ZTE Corporation, "Common aspects between CG and Rach," R2-2101162, Agenda item: 8.6.1, 3GPP TSG-RAN2 Meeting #113-e, e-Meeting, Jan. 25-Feb. 5, 2021. (35 pages).
ZTE Corporation, "NR small data transmissions in Inactive state," RP-210330, Agenda item: 9.8.11, 3GPP TSG RAN meeting #91-e, Electronic Meeting, Mar. 16-26, 2021. (9 pages).
Office Action, dated Apr. 6, 2026, for Colombian Patent Application No. NC2023/0011490. (24 pages)(with English Translation).
Panasonic, "Handling of non-SDT traffic arrival," R2-2102991, Agenda Item: 8.6.3, 3GPP TSG-RAN WG2 Meeting#113bis-e, Online, Apr. 12-20, 2021. (3 pages).

* cited by examiner

Fig. 18
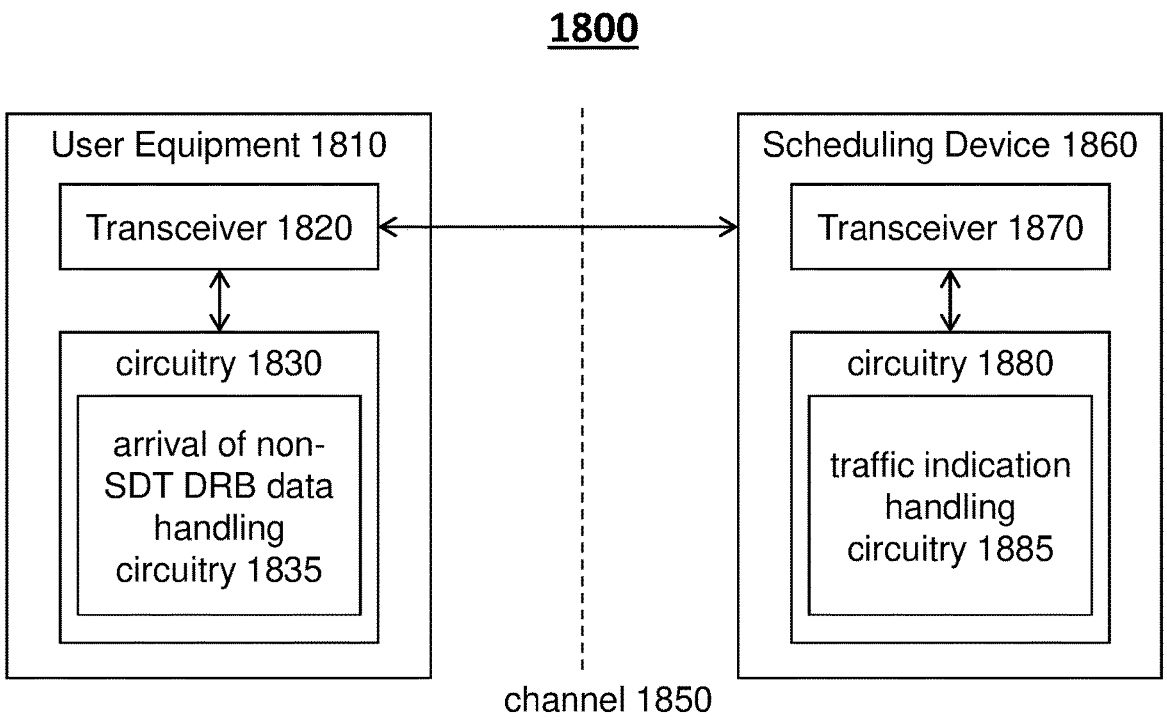
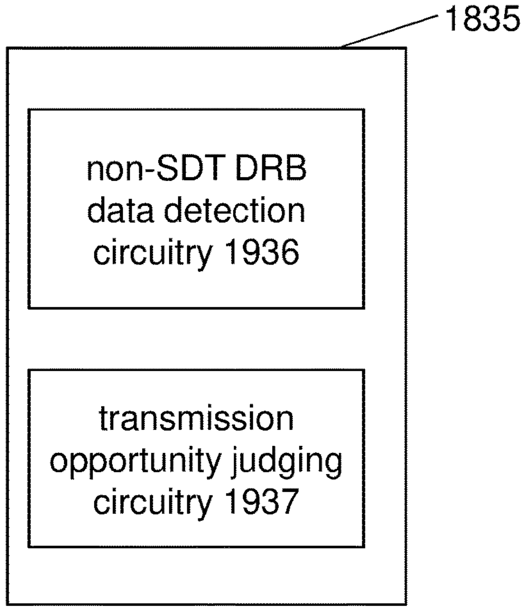
Fig. 19
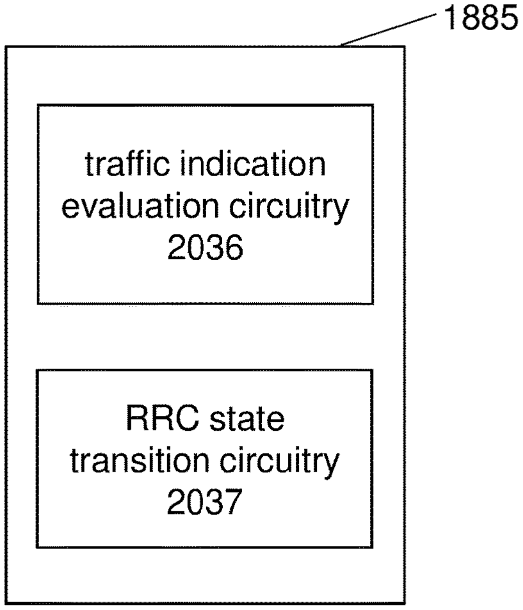
Fig. 20

Fig. 28
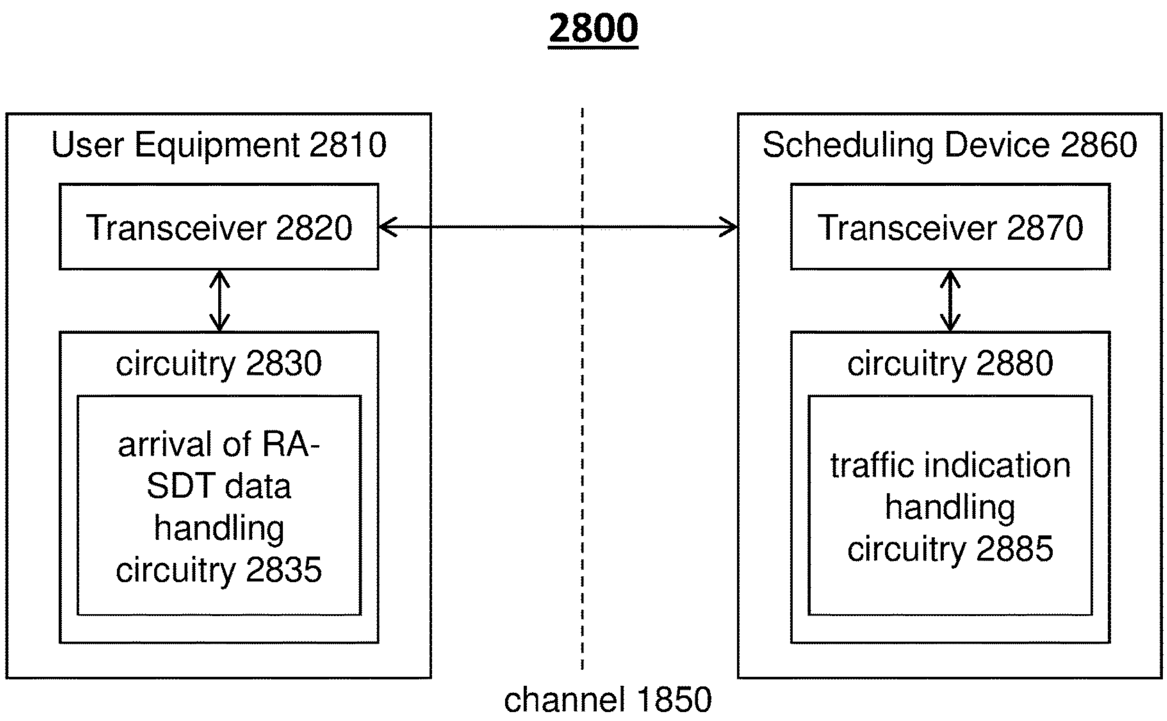
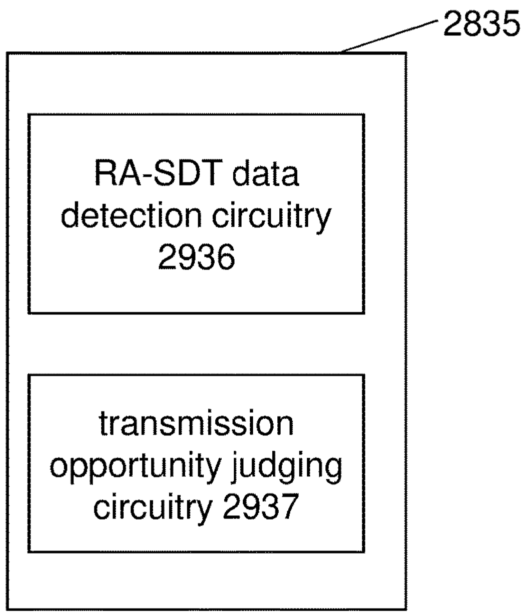
Fig. 29
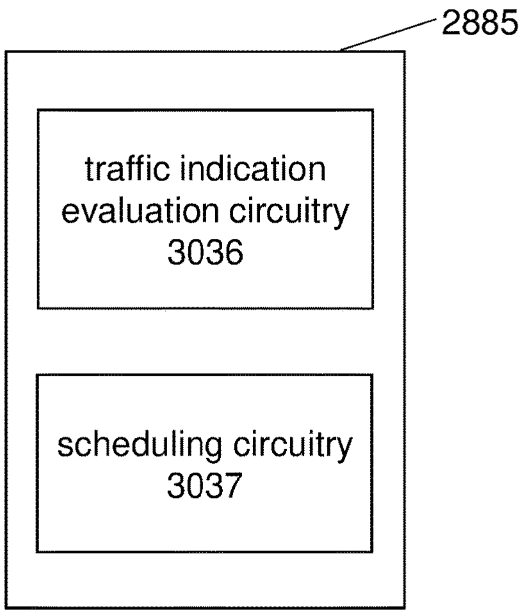
Fig. 30

USER EQUIPMENT, SCHEDULING NODE, METHOD FOR USER EQUIPMENT, AND METHOD FOR SCHEDULING NODE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE and NR, further improvements and options may facilitating efficient operation of the communication system as well as particular devices pertaining to the system.

BRIEF SUMMARY

One non-limiting and exemplary embodiment facilitates efficient handling of the arrival of RA-SDT data, while being in a configured grant (CG) procedure for transmitting data in an inactive state.

In an embodiment, the techniques disclosed here feature an apparatus (e.g., a user equipment, UE). The apparatus comprises a transceiver and circuitry. The circuitry, in operation, detects, while in a procedure for transmitting, in an inactive state, first data for a first logical channel, that second data for a second logical channel are to be transmitted in the inactive state. The procedure for transmitting the first data is a configured grant (CG) procedure for transmitting the first data. The second logical channel is (i) not configured with CG resources for transmissions in the inactive state, and (ii) configured with random access (RA) resources for transmissions in the inactive state. Furthermore, the circuitry, in operation, determines whether or not there is a transmission opportunity to wait for, wherein the transmission opportunity to wait for is i) a transmission opportunity for transmitting at least part of the first data, and ii) expected to occur as part of the procedure for transmitting the first data.

Furthermore, when it is determined that there is no transmission opportunity to wait for or the transmission opportunity to wait for is no longer expected to occur, the circuitry, in operation, initiates a RA procedure for transmitting the second data using the RA resources. Moreover, when it is determined that there is the transmission opportunity to wait for and said transmission opportunity occurs, the circuitry, in operation, controls the transceiver to transmit, using said transmission opportunity, a traffic indication indicating the detection of the second data.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 18 is a block diagram illustrating an exemplary functional structure of a network node and a user equipment;

FIG. 19 is a block diagram illustrating an exemplary functional structure of the circuitry handling the arrival of non-SDT DRB data that may be included in the exemplary user equipment of FIG. 18;

FIG. 20 is a block diagram illustrating an exemplary functional structure of the traffic indication handling circuitry that may be included in the exemplary scheduling device equipment of FIG. 18;

FIG. 28 is a block diagram illustrating an exemplary functional structure of a network node and a user equipment;

FIG. 29 is a block diagram illustrating an exemplary functional structure of the circuitry handling the arrival of non-SDT DRB data that may be included in the exemplary user equipment of FIG. 18;

FIG. 30 is a block diagram illustrating an exemplary functional structure of the traffic indication handling circuitry that may be included in the exemplary scheduling device equipment of FIG. 18;

DETAILED DESCRIPTION

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
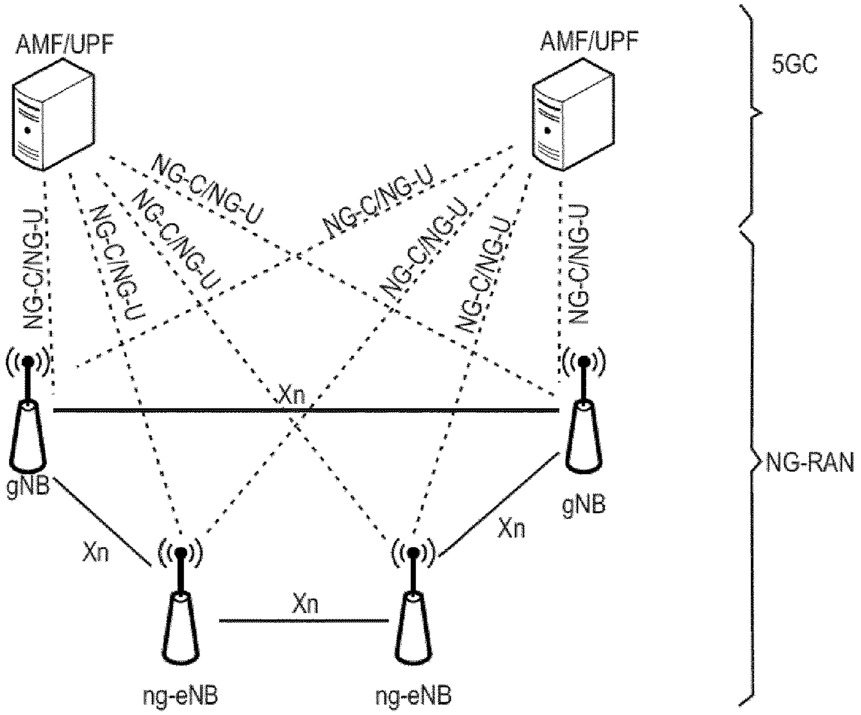
FIG. 1 shows an exemplary architecture for a 3GPP NR system.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP. Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1.000.000 devices/$km^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0). For instance, downlink and uplink transmissions are organized into frames with 10 ms duration, each frame consisting of ten subframes of respectively 1 ms duration. In 5g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

Comparing to LTE numerology (subcarrier spacing and symbol length), NR supports multiple different types of subcarrier spacing, labeled by a parameter μ (in LTE there is only a 15 kHz subcarrier spacing, corresponding to μ=0 in NR). The types NR numerology is summarized in 3GPP TS 38.211, v 15.7.0.

5G NR Functional Split Between NG-RAN and 5GC

Figure 2:
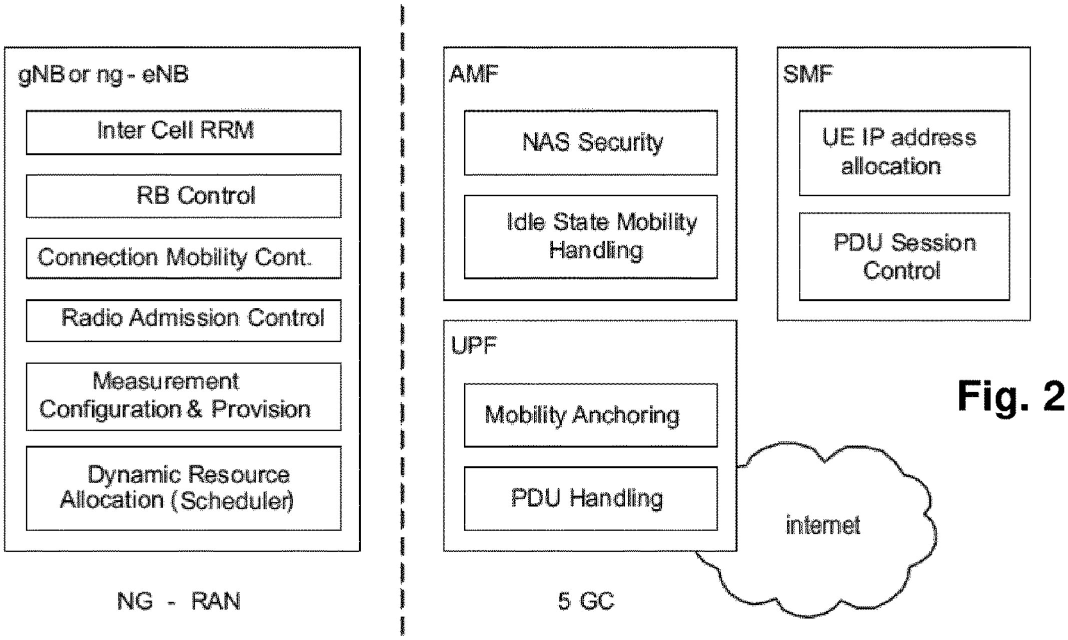
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

- Functions for Radio Resource Management such as Radio Bearer Control, Radio Admission Control. Connection Mobility Control. Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:

- Non-Access Stratum, NAS, signalling termination;
- NAS signalling security;
- Access Stratum, AS, Security control;
- Inter Core Network, CN, node signalling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:

- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g., packet filtering, gating, UL/DL rate enforcement;
- Uplink Traffic verification (SDF to QoS flow mapping);
- Downlink packet buffering and downlink data notification triggering.

Finally, the Session Management function, SMF, hosts the following main functions:

- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

RRC Connection Setup and Reconfiguration Procedures

Figure 3:
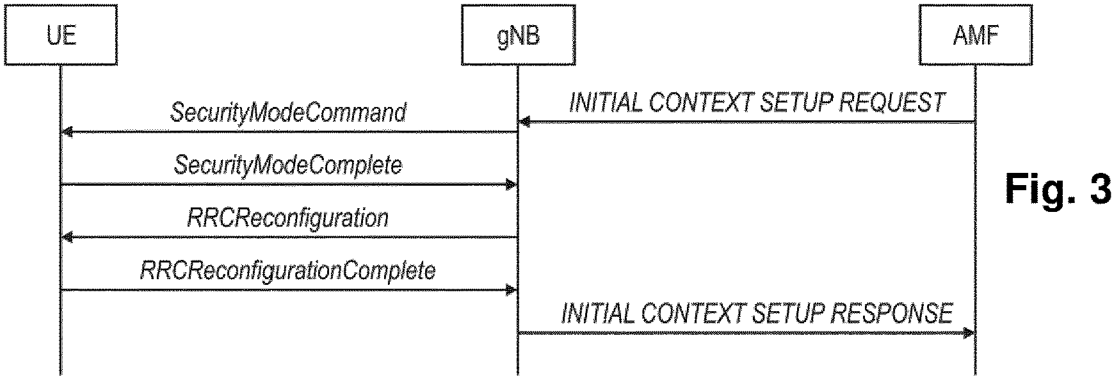
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
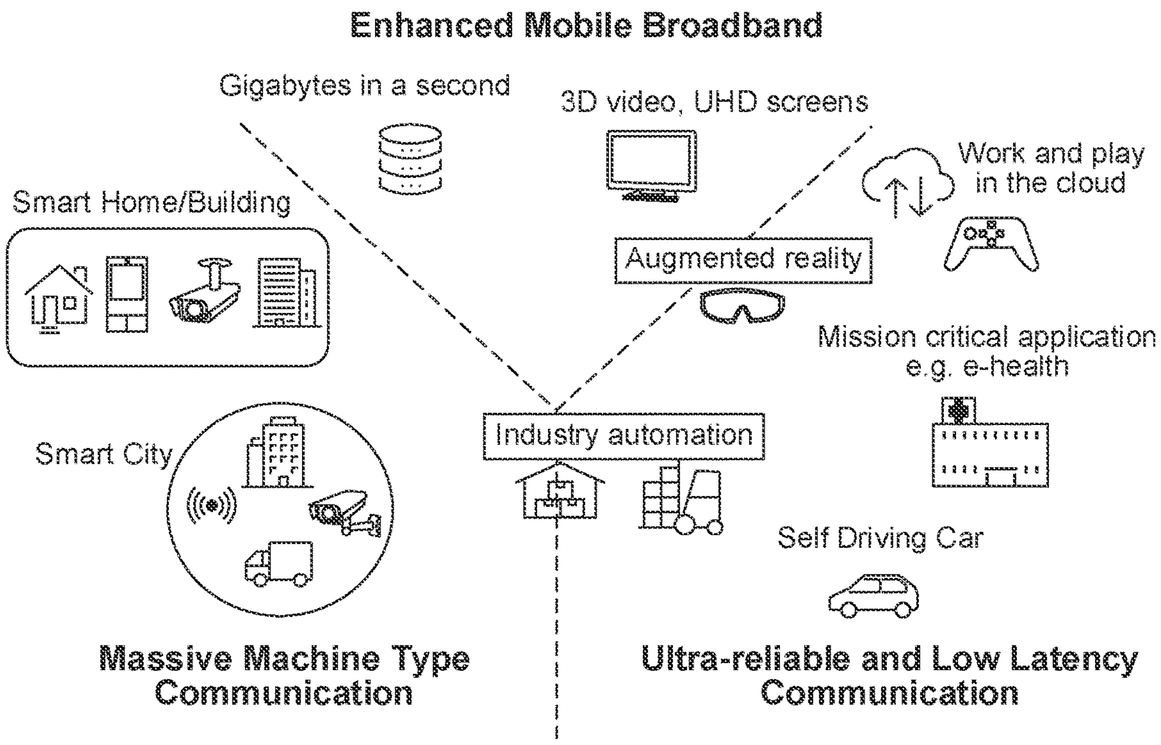
FIG. 4 is a schematic drawing showing usage scenarios of Enhanced mobile broadband (eMBB). Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see. e.g., ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented RealityNirtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
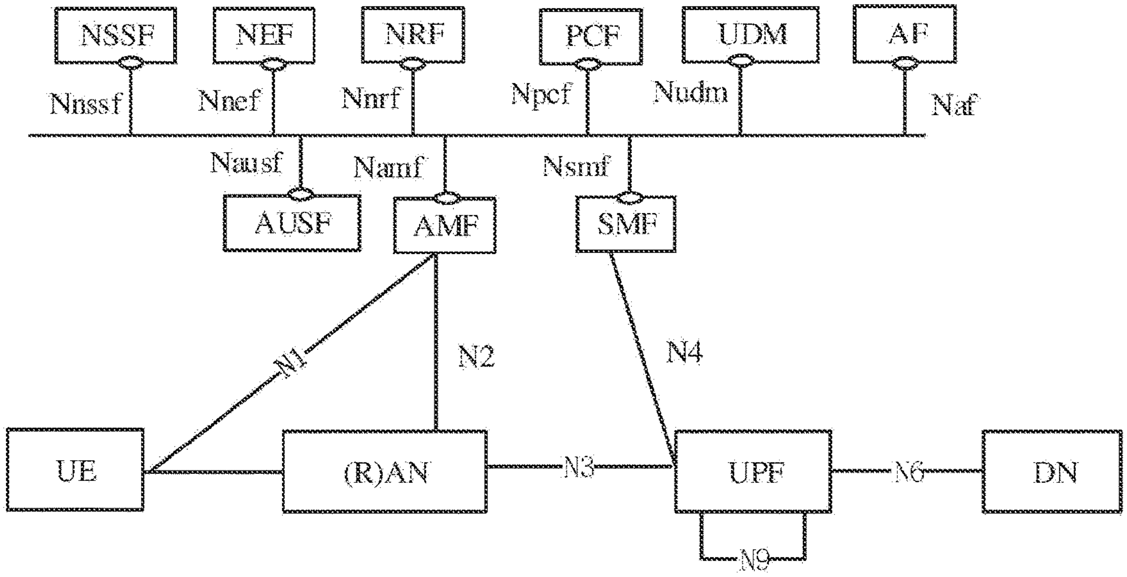
FIG. 5 is a block diagram showing an exemplary 5G system architecture for a non-roaming.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF). Network Repository Function (NRF). Unified Data Management (UDM), Authentication Server Function (AUSF). Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

Control Signals

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

Terminal

A terminal or user terminal or user device or mobile station or mobile node is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay. For instance, a terminal is a physical entity (physical node) within a communication network. Still further, the communication device may be any machine-type communication device, such as IoT device or the like. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

Base Station

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well. A base station may be a scheduling node or network node, e.g., forming a part of the network for providing services to terminals. In particular, a base station may provide wireless access to terminals. Communication between the terminal and the base station is typically standardized and may be defined by different layers, such as PHY, MAC, RRC, etc. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions. The terminology used in LTE is eNB (or eNodeB), while the currently used terminology for 5G NR is gNB. The term base station or radio base station here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Uplink/Downlink/Sidelink

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

Data Channels/Control Channels

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

Reference Signals

In the present disclosure, the reference signals are signals known to both a base station and a mobile station and each reference signal may be referred to as a Reference Signal (RS) or sometimes a pilot signal. The reference signal may be any of a DMRS, a Channel State Information—Reference Signal (CSI-RS), a Tracking Reference Signal (TRS), a Phase Tracking Reference Signal (PTRS), a Cell-specific Reference Signal (CRS), and a Sounding Reference Signal (SRS).

Time Intervals

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols. Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

/Frequency Bands

The present disclosure may be applied to any of a licensed band and an unlicensed band.

Communication

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

Antenna Ports

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Downlink Control Channel Monitoring, PDCCH, DCI

Many of the functions operated by the UE involve the monitoring of a downlink control channel (e.g., the PDCCH, see 3GPP TS 38.300 v 15.6.0, section 5.2.3) to receive, e.g., particular control information or data destined to the UE.

A non-exhaustive list of these functions is given in the following:

a paging message monitoring function, a system information acquisition function, signalling monitoring operation for a Discontinued Reception, DRX, function, inactivity monitoring operation for a Discontinued Reception, DRX, function.

random access response reception for a random access function, reordering function of a Packet Data Convergence Protocol, PDCP, layer.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1).

Said DCI formats represent predetermined formats in which respective information is formed and transmitted. In particular, DCI formats 0_1 and 1_1 are used for scheduling PUSCH and PDSCH, respectively, in one cell.

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g., limiting the maximum amount of time that the UE is to monitor the PDCCH. For instance, the UE may not need to indefinitely monitor the PDCCH, but may stop the monitoring after some time so as to be able to save power.

As mentioned above, one of the purposes of DCI on the PDCCH is the dynamic scheduling of resources in downlink or uplink or even sidelink. In particular, some formats of DCI are provided to carry indication of resources (resource allocation, RA) allocated to a data channel for a particular user. The resource allocation may include specification of resources in frequency domain and/or time domain.

UE Identifications

RNTI stands for Radio Network Temporary Identifier. For instance, an RNTI can used to differentiate and identify a UE in the radio cell. Further an RNTI can also identify a specific radio channel, a group of UEs in case of paging, a group of UEs for which power control is issued by the eNB, system information transmitted for all the UEs by 5G gNB. 5G NR defines numerous different identifications for the UE, some of which are presented in the following table (see 3GPP TS 38.321 v 15.8.0, section 7.1).

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| RA-RNTI | Random Access Response | DL-SCH | N/A |
| Temporary C-RNTI | Contention Resolution (when no valid C-RNTI is available) | DL-SCH | CCCH, DCCH |
| Temporary C-RNTI | Msg3 transmission | UL-SCH | CCCH, DCCH, DTCH |
| C-RNTI, MCS-C-RNTI | Dynamically scheduled unicast transmission | UL-SCH | DCCH, DTCH |
| C-RNTI | Dynamically scheduled unicast transmission | DL-SCH | CCCH, DCCH, DTCH |

-continued

| RNTI | Usage | Transport Channel | Logical Channel |
|---|---|---|---|
| MCS-C-RNTI | Dynamically scheduled unicast transmission | DL-SCH | DCCH, DTCH |
| C-RNTI | Triggering of PDCCH ordered random access | N/A | N/A |
| CS-RNTI | Configured scheduled unicast transmission (activation, reactivation and retransmission) | DL-SCH, UL-SCH | DCCH, DTCH |
| CS-RNTI | Configured scheduled unicast transmission (deactivation) | N/A | N/A |
| TPC-PUCCH-RNTI | PUCCH power control | N/A | N/A |
| TPC-PUSCH-RNTI | PUSCH power control | N/A | N/A |
| TPC-SRS-RNTI | SRS trigger and power control | N/A | N/A |
| INT-RNTI | Indication pre-emption in DL | N/A | N/A |
| SFI-RNTI | Slot Format Indication on the given cell | N/A | N/A |
| SP-CSI-RNTI | Activation of Semi-persistent CSI reporting on PUSCH | N/A | N/A |

NOTE:
The usage of MCS-C-RNTI is equivalent to that of C-RNTI in MAC procedures (except for the C-RNTI MAC CE).

Apart from the above-identified RNTIs, there can be further IDs, such as the Inactive-RNTI (I-RNTI) (see TS 38.331 v15.8.0. e.g., section 6.3.2). The Inactive-RNTI is used for a UE in the RRC_INACTIVE state and for example in the process of identifying and locating the suspended UE context of that UE. According to one implementation, the network assigns the I-RNTI when the UE moves (e.g., from RRC_CONNECTED) to the RRC_INACTIVE state (e.g., as part of the RRCRelease message within SuspendConfig). There are two types of I-RNTIs, namely the full I-RNTI and the short I-RNTI. The network can inform the UE (e.g., as part of SIB1, System Information Block 1), which I-RNTI to use when resuming the connection. The full I-RNTI is a bit string of length 40 bits, while the short I-RNTI is a bit string of length 24 bits.

Random Access Procedure

Similar to LTE, 5G NR provides a RACH (Random Access Channel) procedure (or simply random access procedure). For instance, the RACH procedure can be used by the UE to access a cell it has found. The RACH procedure can also be used in other contexts within NR, for example:

For handover, when synchronization is to be established to a new cell;

To reestablish uplink synchronization to the current cell, if synchronization has been lost due to a too long period without any uplink transmission from the device;

To request uplink scheduling, if no dedicated scheduling request resource has been configured for the device.

There are numerous events that may trigger the UE to perform a random access procedure (see 3GPP TS 38.300, section 9.2.6), including the following. The random access procedure is triggered by a number of events:

Initial access from RRC_IDLE;

RRC Connection Re-establishment procedure;

DL or UL data arrival during RRC_CONNECTED when UL synchronisation status is "non-synchronised";

UL data arrival during RRC_CONNECTED when there are no PUCCH resources for SR available;

SR failure;

Request by RRC upon synchronous reconfiguration (e.g., handover);

Transition from RRC_INACTIVE;

To establish time alignment for a secondary TAG;

Request for Other SI (see clause 7.3);

Beam failure recovery;

Consistent UL LBT failure on SpCell.

A mobile terminal can be scheduled for uplink transmission, if its uplink transmission is time synchronized. Therefore, the Random Access Channel (RACH) procedure plays a role as an interface between non-synchronized mobile terminals (UEs) and the orthogonal transmission of the uplink radio access. For instance, the Random Access is used to achieve uplink time synchronization for a user equipment, which either has not yet acquired, or has lost, its uplink synchronization. Once a user equipment has achieved uplink synchronization, the base station can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

There can be at least two types of random access procedures, allowing access to be either contention based (i.e., implying an inherent risk of collision), or contention free (non-contention based). An exemplary definition of a random access procedure can be found in 3GPP TS 38.321, v16.1.0 section 5.1.

Figure 6:
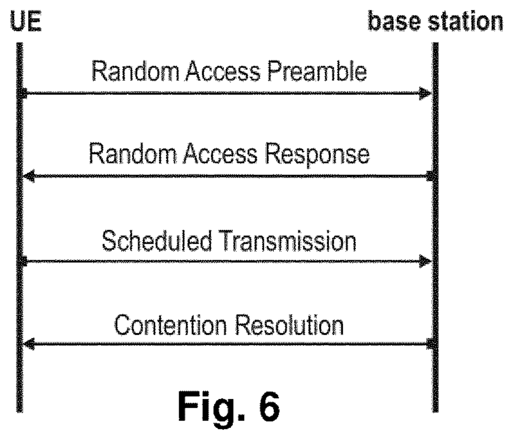
FIGS. 6 and 7 illustrate the contention-based and contention-free RACH procedure.

The RACH procedure will be described in the following in more detail, with reference to FIGS. 6 and 7. In the following, the contention-based random access procedure is being described in more detail with respect to FIG. 6. This procedure consists of four "steps" and thus can be termed for example as a 4-step RACH procedure. First, the user equipment transmits a random access preamble on the Physical Random Access Channel (PRACH) to the base station (i.e., message 1 of the RACH procedure). After the base station has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency and slot in which the preamble was detected. If multiple user equipments transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions based on the timing of the received preamble, an initial uplink resource assignment (grant) for the transmission of the first scheduled transmission and an assignment of a Temporary Cell Radio Network Temporary Identifier (T-CRNTI). This T-CRNTI is used by the base station to address the mobile(s) whose RACH preamble was detected until the RACH procedure is finished, because the "real" identity of the mobile at this point is not yet known by the base station.

The user equipment monitors the PDCCH for reception of the random access response message within a given time window (e.g., termed RAR reception window), which can be configured by the base station. In response to the RAR message received from the base station, the user equipment transmits the first scheduled uplink transmission on the radio resources assigned by the grant within the random access response. This scheduled uplink transmission conveys the actual message with certain functionality such as the RRC Connection Request, a RRC Resume Request or the buffer status report.

In case of a preamble collision having occurred in the first message of the RACH procedure (i.e., multiple user equipment have sent the same preamble on the same PRACH resource), the colliding user equipments will receive the same T-CRNTI within the random access response and will also collide in the same uplink resources when transmitting their scheduled transmission in the third step of the RACH procedure. In case the scheduled transmission from one user equipment is successfully decoded by the base station, the contention remains unsolved for the other user equipment(s). For resolution of this type of contention, the base station sends a contention resolution message (a fourth message) addressed to the C-RNTI or Temporary C-RNTI. This concludes the procedure.

Figure 7:
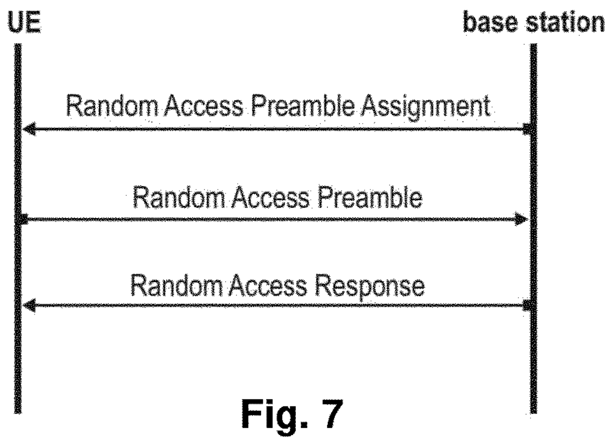

FIG. 7 is illustrating the contention-free random access procedure, which is simplified in comparison to the contention-based random access procedure. The base station provides in a first step the user equipment with the dedicated preamble to use for random access so that there is no risk of collisions. i.e., multiple user equipments transmitting the same preamble. Accordingly, the user equipment subsequently sends the preamble that was signaled by the base station in the uplink on a PRACH resource. Since the case that multiple UEs are sending the same preamble is avoided for a contention-free random access, essentially, a contention-free random access procedure is finished after having successfully received the random access response by the UE.

3GPP also defines a 2-step (contention-based) RACH procedure for 5G NR, where a message 1 (termed as MsgA), that corresponds to messages 1 and 3 in the four-step LTE/NR RACH procedure, is transmitted at first. The MsgA of the 2-step RACH type includes a preamble on the Physical Random Access Channel (PRACH) and a payload on the Physical Uplink Shared Channel (PUSCH). After MsgA transmission, the UE monitors for a response from the gNB within a configured time window. Then, the gNB will respond with a message 2 (termed as MsgB), corresponding to messages 2 and 4 of the 4-step LTE/NR RACH procedure. This MsgB can include, e.g., a Success random access response (RAR), a Fallback RAR, and optionally a backoff indication. If contention resolution is successful upon receiving the Success RAR, the UE ends the random access procedure; while if Fallback RAR is received in MsgB, the UE performs message 3 transmission (as in 4-step RACH procedure) and monitors contention resolution. Some further exemplary assumptions are made for the 2-step RACH procedure, such as that the UE, after deciding on the RACH type (e.g., the 2-step RACH), keeps retrying that same RACH type until failure. But there may be also the possibility that the UE can switch to the 4-step RACH procedure after certain reattempts of transmitting MsgA.

Moreover, the network may semi-statically determine radio resources, to be used for performing the 2-step RACH procedure and the 4-step RACH procedure, that are exclusive from one another. The radio resources used for transmitting the first message in the RACH procedure include at least the RACH occasion as well as the preambles. For instance, in the 2-step RACH procedure, the first message MsgA uses not only the PRACH resource (e.g., the RACH occasion and preamble) but also the associated PUSCH resources.

Generally, for RACH preambles, see for example, 3GPP TS 38.211 V16.2.0, "Table 6.3.3.2-2: Random access configurations for FR1 and paired spectrum/supplementary uplink" and section 6.3.3.2. "Mapping to physical resources."

RRC States (RRC_Connected, RRC_Inactive, RRC Idle)

In LTE, the RRC state machine consisted of only two states, the RRC idle state (mainly characterized by high power savings, UE autonomous mobility and no established UE connectivity towards the core network) and the RRC connected state in which the UE can transmit user plane data while mobility is network-controlled to support lossless service continuity. In connection with 5G NR, the LTE-related RRC state machine is extended with an inactive state (see, e.g., TS 38.331 v16.1.0, FIGS. 4.2.1-1 and 4.2.1-2), as explained in the following.

Figure 8:
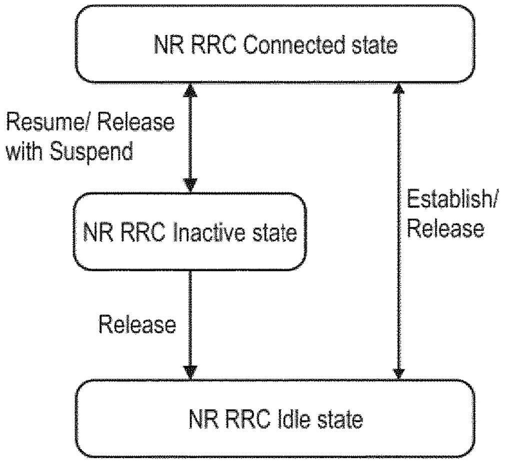
FIG. 8 illustrates the possible RRC state changes.

The RRC in NR 5G (see TS 38.331, section 4) supports the following three states, RRC Idle, RRC Inactive, and RRC Connected. A UE is either in RRC_CONNECTED state or in RRC_INACTIVE state when an RRC connection has been established. If this is not the case, i.e., no RRC connection is established, the UE is in RRC_IDLE state. The following state transitions are possible as illustrated in FIG. 8:

- from RRC_IDLE to RRC_CONNECTED, following, e.g., the "connection establishment" procedure;
- from RRC_CONNECTED to RRC_IDLE, following, e.g., the "connection release" procedure;
- from RRC_CONNECTED to RRC_INACTIVE, following, e.g., the "connection release with suspend" procedure;
- from RRC_INACTIVE to RRC_CONNECTED, following, e.g., the "connection resume" procedure;
- from RRC_INACTIVE to RRC_IDLE (uni-directional), following, e.g., the "connection release" procedure.

The new RRC state, RRC Inactive, is defined for the new radio technology of 5G 3GPP, so as to provide benefits when supporting a wider range of services such as the eMBB (enhanced Mobile Broadband), mMTC (massive Machine Type Communications) and URLLC (Ultra-Reliable and Low-Latency Communications) which have very different requirements in terms of signalling, power saving, latency, etc. The new RRC Inactive state shall thus be designed to allow minimizing signaling, power consumption and resource costs in the radio access network and core network while still allowing, e.g., to start data transfer with low delay.

According to an exemplary 5G NR implementation, the different states are characterized as follows (see section 4.2.1 of TS 38.331):

"—RRC_IDLE:

A UE specific DRX may be configured by upper layers;

UE controlled mobility based on network configuration;

The UE:

Monitors Short Messages transmitted with P-RNTI over DCI (see clause 6.5);

- Monitors a Paging channel for CN paging using 5G-S-TMSI;
- Performs neighbouring cell measurements and cell (re-)selection;
- Acquires system information and can send SI request (if configured).
- Performs logging of available measurements together with location and time for logged measurement configured UEs.

RRC_INACTIVE:

- A UE specific DRX may be configured by upper layers or by RRC layer;
- UE controlled mobility based on network configuration;
- The UE stores the UE Inactive AS context;
- A RAN-based notification area is configured by RRC layer;

The UE:

- Monitors Short Messages transmitted with P-RNTI over DCI (see clause 6.5);
- Monitors a Paging channel for CN paging using 5G-S-TMSI and RAN paging using fullI-RNTI;
- Performs neighbouring cell measurements and cell (re-)selection;
- Performs RAN-based notification area updates periodically and when moving outside the configured RAN-based notification area;
- Acquires system information and can send SI request (if configured).
- Performs logging of available measurements together with location and time for logged measurement configured UEs.

RRC_CONNECTED:

- The UE stores the AS context;
- Transfer of unicast data to/from UE;
- At lower layers, the UE may be configured with a UE specific DRX;
- For UEs supporting CA, use of one or more Scells, aggregated with the SpCell, for increased bandwidth;
- For UEs supporting DC, use of one SCG, aggregated with the MCG, for increased bandwidth;
- Network controlled mobility within NR and to/from E-UTRA;
- The UE:
  - Monitors Short Messages transmitted with P-RNTI over DCI (see clause 6.5), if configured;
  - Monitors control channels associated with the shared data channel to determine if data is scheduled for it;
  - Provides channel quality and feedback information;
  - Performs neighbouring cell measurements and measurement reporting;
  - Acquires system information;
  - Performs immediate MDT measurement together with available location reporting."

According to the characteristics of the RRC Inactive state, for the Inactive UE the connection (both for user plane and control plane) is maintained with RAN and the core network. More specifically, in RRC Inactive, although the connection still exists, it is suspended, or put differently the connection is not active anymore. On the other hand, in RRC Connected state, the connection exists and is active, e.g., in the sense that it is used for a data transmission. In RRC Idle state, the UE has no RRC connection with the RAN and the core network, which also means that. e.g., the radio base station does not have any context of the UE and, e.g., does not know the identification of the UE and does not have security parameters relating to the UE to be able to properly decode data transmitted by the UE (security. e.g., ensures integrity of the transmitted data). UE context may be available in the core network, but would have to be fetched first by the radio base station.

In addition, the paging mechanism (may also be called, e.g., notification mechanism) for user equipments in the radio cell is based on so called radio access network, RAN,-based notification areas (in short RNAs). The radio access network should be aware of the current RNA the user equipment is located in, and the user equipment may assist the gNB to track the UE moving among various RNAs. The RNA can be UE-specific.

Figure 9:
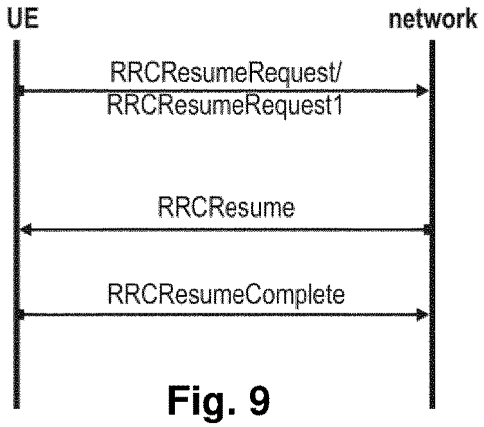
FIG. 9 illustrates a message exchange for the RRC Resume procedure.

One example of an RRC resume procedure to move the UE from the RRC_Inactive state to the RRC_Connected state (see TS 38.331 section 5.3.13) is explained in the following with reference to FIG. 9. The purpose of this procedure is to resume a suspended RRC connection (may include resuming signaling and data radio bearers).

The procedure allows to transmit either the RRCResumeRequest message or the RRCResumeRequest1 message. When transmitting the RRCResumeRequest message, the short I-RNTI (e.g., truncated I-RNTI) is used as the UE identity (exemplary termed "resumeIdentity"). When transmitting the RRCResumeRequest1 message, the full I-RNTI is used as the UE identity (exemplary termed "resumeIdentity"). UE checks the indication "useFullResumeID" in SIB1 and determines to transmit either the RRCResumeRequest or the RRCResumeRequest1 message. If the "useFullResumeID" indicates "true," the UE will transmit RRCResumeRequest1 with full I-RNTI; otherwise, the UE will transmit RRCResumeRequest with short I-RNTI. The actions the UE performs for the RRC Resume procedure (see section 5.3.13.4 of TS 38.331) include resuming the SRB2 and all DRBs (which were suspended when entering the RRC Inactive state, see below release procedure).

Figure 10:
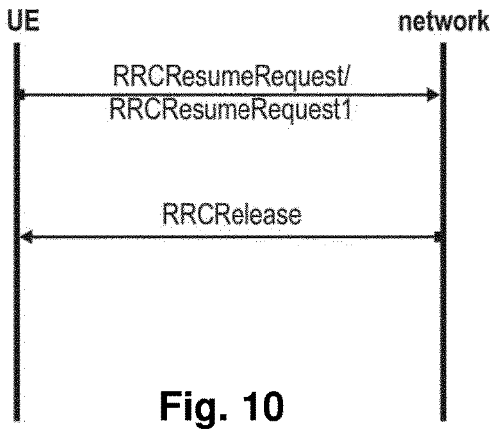
FIGS. 10 and 11 illustrate a message exchange for the RRC Release procedure.

The RRCResume procedure can be also used to perform the RNA update upon UE moving out of the configured RNA. In this case, the network sends an RRCRelease instead of RRCResume as the response to the RRCResumeRequest/RRCResumeRequest1 message, as shown in FIG. 10. The UE remains in RRC_INACTIVE after receiving the RRCRelease message.

Figure 11:
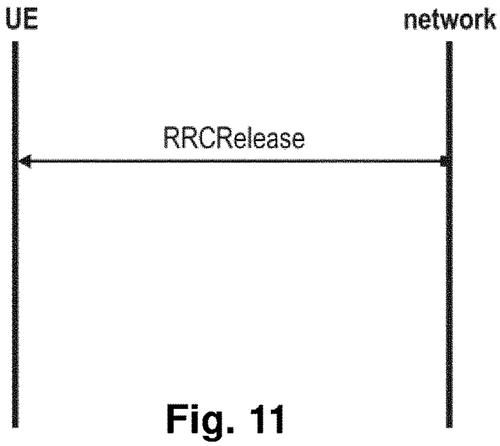

One example of a subsequent RRC connection release procedure to transition the UE from the RRC_Connected state to the RRC Inactive state (see TS 38.331 section 5.3.8) is explained in the following with reference to FIG. 11. The purpose of this procedure is to release the RRC connection or to suspend the RRC connection. For instance, the network initiates the RRC connection release procedure to transit a UE in RRC_CONNECTED to RRC_IDLE or to RRC_INACTIVE. The actions the UE performs for the RRC Connection Release procedure (see section 5.3.8.3 of TS 38.331) include suspending all SRB(s) (Signaling Radio Bearers) and DRB(s) (Data Radio Bearers) except SRB0, in case the release is done with suspend (e.g., "RRCRelease includes suspendConfig"). Correspondingly, the UE in RRC Inactive state does not have any non-suspended or active DRB (UE only has suspended DRBs). SRB0, which is kept active, even in the RRC Inactive state, can be used by the UE, e.g., for performing the RACH procedure, e.g., when carrying RRC messages, such as the RRCResumeRequest, RRCResumeRequest1, RRCSetupRequest.

The term inactive state used in the application is to be broadly understood as a state in which regular and extensive data exchange between the UE and the base station is not possible or not common. For instance, the UE, when in inactive state. (e.g., called "inactive UE") may not have actively-used data connections, but still has one or more inactive data connections (e.g., could also be called existent but not currently-used) that allow a (small) data transmission without the need to resume the data connection first. For sake of completion, the UE in the idle state does not have data connections over which the UE could transmit data to the base station, while the UE in connected state has one or more active data connections that can be immediately used to carry data to the base station.

Data Transmission by UE in RRC Inactive State—SDT Procedure

In more detail, 5G NR supports the RRC_INACTIVE state, and UEs with infrequent (periodic and/or non-periodic) data transmission are generally maintained by the network in the RRC_INACTIVE state. Until Rel-16, the RRC_INACTIVE state does not support data transmissions. Hence, the UE has to resume the connection (e.g., move to RRC_CONNECTED state) for any DL (MobileTerminated) and UL (MobileOriginated) data. Connection setup (or resume) and subsequently release to RRC_INACTIVE state would have to happen for each data transmission, however small and infrequent the data packets are. This results in unnecessary power consumption and signalling overhead.

Figure 12:
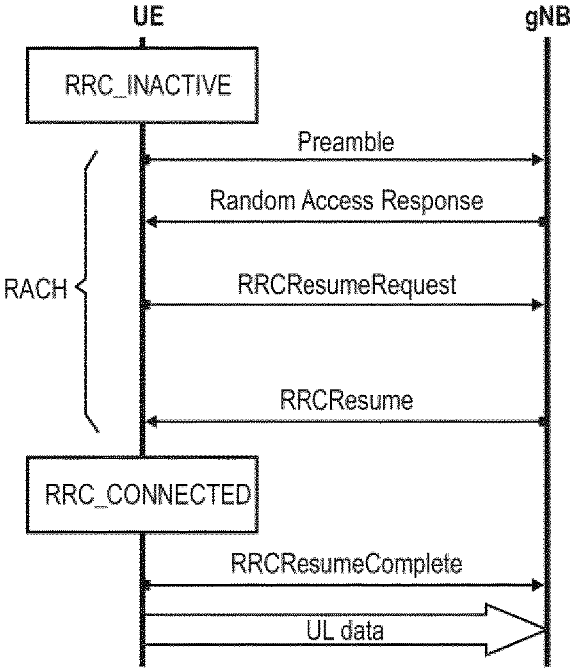
FIG. 12 illustrates a message exchange of the prior art for uplink data transmission, including a state change of the UE from Inactive to Connected state.

Specific examples of small and infrequent data traffic include the following use cases:

- Smartphone applications:
  - Traffic from Instant Messaging services (whatsapp, QQ, wechat, etc.)
  - Heart-beat/keep-alive traffic from IM/email clients and other apps
  - Push notifications from various applications
- Non-smartphone applications:
  - Traffic from wearables (periodic positioning information, etc.)
  - sensors (Industrial Wireless Sensor Networks transmitting temperature, pressure readings periodically or in an event triggered manner, etc.)
  - smart meters and smart meter networks sending periodic meter readings An exemplary procedure of the prior art (in this case a 5G-NR-compliant prior art solution) to enable a UE in the RRC Inactive state, after transition to the RRC Connected state, to transmit (small) data will be briefly explained in the following with reference to FIG. 12. As apparent from the figure, the UE is assumed to be in RRC_Inactive state, which may, e.g., involve that the UE (and gNB) has all data radio bearers suspended, and that no data can be transmitted to the gNB. In order to enable the UE to transmit data, the UE has to be first transitioned into the RRC Connected state, which can be done by the UE requesting to resume the RRC connection (here transmitting RRCResumeRequest) as part of the RACH procedure (in FIG. 12, e.g., using the 4-step RACH procedure).

In detail, the UE may transmit the preamble to the current gNB, then receives a corresponding random access response with a (small) UL grant of radio resources, which are used by the UE to transmit the RRCResumeRequest message as msg3 of the RACH procedure. Finally, the new gNB provides the RRCResume message to the UE, which in turn then transitions to the RRC Connected state, including the resumption of all data radio bearers. In RRC_Connected state, the UE is then able to transmit the UL data.

The gNB may decide that a UE should indeed by transitioned to RRC_CONNECTED state, after this UL small data transmission. The control in said respect may thus rest with the gNB, although the UE might request to resume the RRC connection. One exemplary possibility is that the gNB takes into account the buffer status report, that the UE could transmit, e.g., in the Msg3 or MsgA, to decide whether the UE should transition to the RRC_CONNECTED state or not. The buffer status report indicates the actual amount of data in the UE buffer. For instance, if the buffer status report indicates a large amount of data in the UE buffer, the gNB might decide to transition the UE from RRC_INACTIVE to RRC_CONNECTED state (e.g., by gNB sending RRCResume message). On the other hand, if the buffer status report indicates only little amount of data in the UE buffer, the gNB might decide to keep the UE in the RRC_INACTIVE state (e.g., by gNB sending RRCRelease message). Furthermore, also the absence of the buffer status report in the Msg3/MsgA may provide an indication to the gNB, e.g., that no further data is available in the UE buffer and the UE can stay in RRC_INACTIVE.

As can be appreciated from the description of FIG. 12, the above process, according to which the UE first needs to transition from the inactive state to the connected state such that the UE can send any user data in the uplink, introduces latency and consumes significant UE power for each transmission of user data. Moreover, the signalling overhead caused for INACTIVE-state UEs when transmitting small data packets is a general problem, and will even be exacerbated with more UEs in 5G NR.

Therefore, 3GPP is intending to enable the RRC_Inactive UE to transmit (small) data in the uplink without changing the UE state to RRC Connected. In general, any device that has intermittent (small) data packets, when in the INACTIVE state, will benefit from enabling (small)data transmissions in the INACTIVE state.

The following assumptions, made for FIGS. 13 and 14 and also for subsequently describing the concepts, solutions and variants of the invention, are to be considered only as exemplary and not as limiting the RACH-based small-data uplink transmission.

Figure 13:
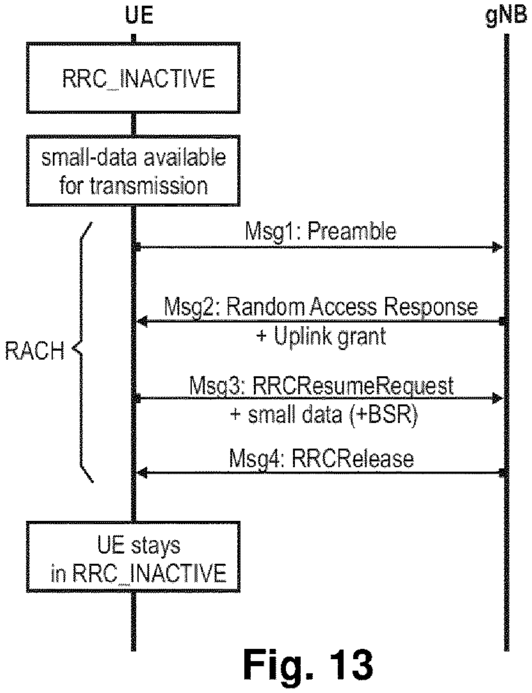
FIGS. 13 and 14 illustrate an exemplary four-step RACH respectively two-step RACH usable for small-data uplink transmissions for an RRC_INACTIVE UE.
Figure 14:
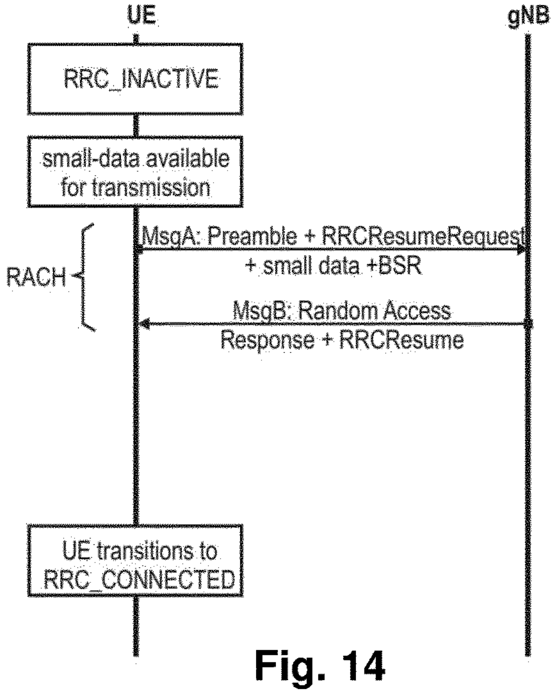

Moreover, when assuming a RACH-based small-data uplink transmission as an example, the UE can use either the 2-step RACH or 4-step RACH to send small data in the uplink (see MsgA or Msg3), and simplified and exemplary RACH-based small-data uplink transmission procedures are illustrated in FIGS. 13 and 14. In both FIGS. 13 and 14 it is exemplarily assumed that the UE is already in RRC_INACTIVE state and has small-data available for transmission. FIG. 13 assumes a 4-step RACH procedure and illustrates how the UE transmits the small data with the Msg3. FIG. 14 assumes a 2-step RACH procedure and illustrates how the UE transmits the small data with the MsgA.

According to one example, the control message and the small data are transmitted together to the base station. e.g., together in the same transport block, where the UE builds the transport block using the resources and multiplexes data and signaling together in the same transport block of the MAC layer. For the 4-step RACH case, the small data is transmitted in the Msg3, based, e.g., on the radio resources granted through the uplink grant received from the gNB in the Msg2. For the 2-step RACH case, the small data is transmitted in the MsgA, e.g., using radio resources that are selected by the UE from some previously-configured radio resources, e.g., in connection with the selected RACH preamble.

Moreover, FIGS. 13 and 14 illustrate that the buffer status report can be included in the Msg3 respectively MsgA, although the BSR is only illustrated within parentheses to reflect that including the BSR is merely an exemplary possibility. For instance, in FIG. 13 it is exemplarily assumed that the gNB decides to keep the UE in RRC_Inactive state. e.g., because the BSR is either absent or indicates only little uplink small data in the UE buffer. Correspondingly, an RRCRelease message is transmitted for the Msg4. On the other hand, in FIG. 14 it is exemplarily assumed that the gNB decides to transition the UE to the RRC_Connected state, e.g., because the BSR indicates a significant amount of uplink data in the UE buffer that has to be transmitted by the UE. Correspondingly, an RRCResume message is transmitted for the MsgA.

Moreover, although in FIG. 13 the uplink grant is illustrated separately from the Random Access Response of Msg2, in FIG. 13 and in similar implementations in the following, the uplink grant may equally be considered as belonging to and being part of the Random Access Response.

In summary, a possible exemplary implementation of a small-data uplink transmission for RRC_INACTIVE UEs is possible and could be, e.g., based on the RACH procedure, be it a 2-step or 4-step RACH procedure (see FIGS. 13 and 14).

In the above, a single small-data uplink transmission (e.g., using the Msg3/MsgA of RACH) was discussed. Moreover, 3GPP agreed that it should be possible for a UE in RRC_INACTIVE state to send (and possibly receive) multiple UL (and respectively DL) transmissions using a same procedure without transitioning to the RRC_CONNECTED state.

Figure 15:
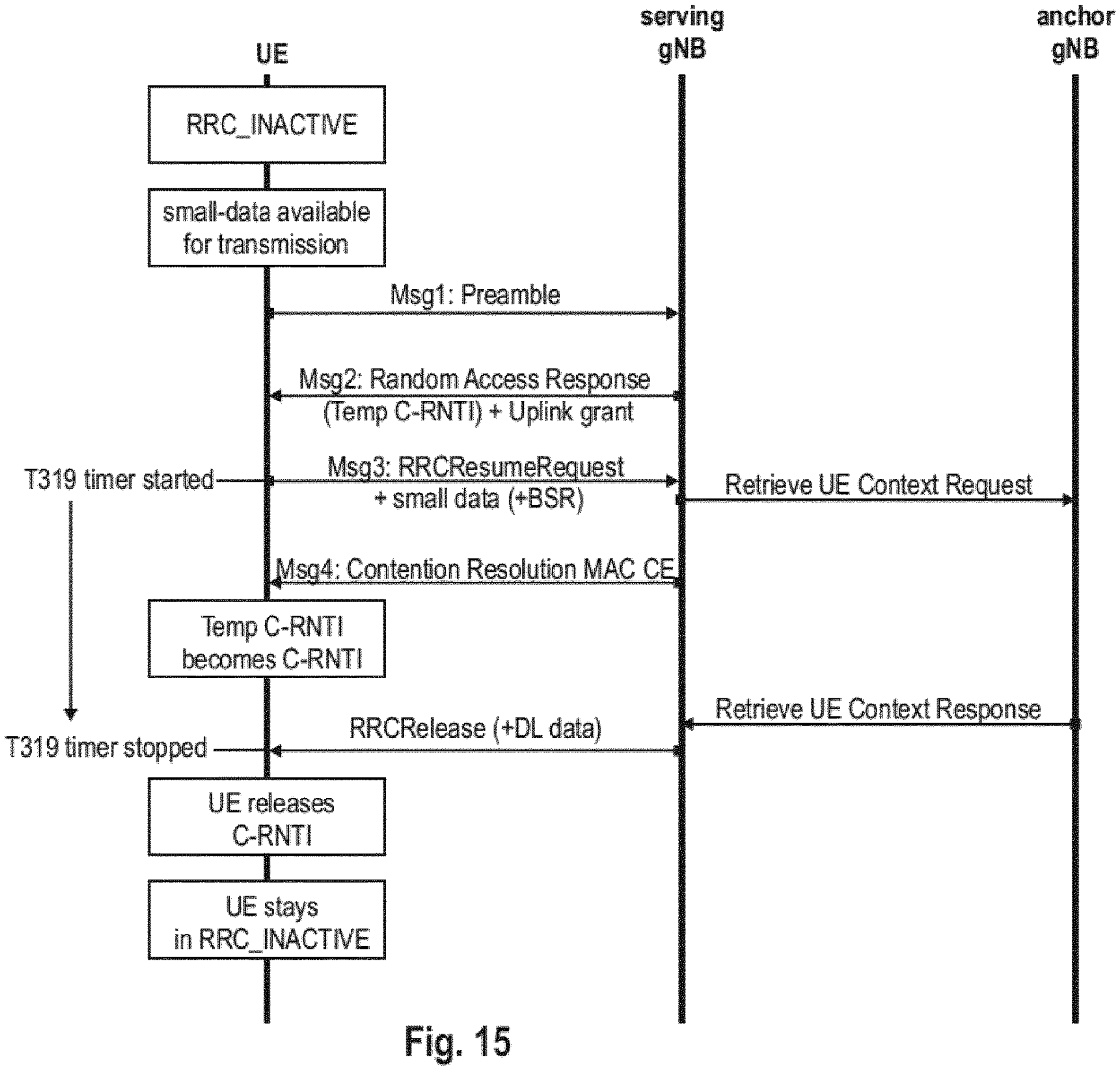
FIG. 15 illustrates an exemplary SDT procedure including a single transmission of small data during the RACH procedure.

FIG. 15 illustrates an exemplary implementation of a single-SDT transmission procedure with more details than the simplified exemplary illustration of FIG. 13. To facilitate the illustration and subsequent discussion, it is exemplarily assumed that the multi-SDT transmission procedure is based on the 4-step RACH.

Furthermore, it is exemplarily assumed that the UE, while in RRC_INACTIVE state, has moved from its previous gNB (anchor gNB) to the current gNB (which thus is its current serving gNB). This may require that the serving gNB, as part of the RACH procedure, obtains the UE context from the anchor gNB. e.g., so that the serving gNB is able to authenticate the UE (unknown to the serving gNB).

In said connection, it is also exemplarily assumed that the Contention Resolution Identity MAC Control Element (CR MAC CE) is transmitted separately from the response to the RRCResumeRequest message of the UE (in the example of FIG. 15, the RRCRelease message). The main purpose of said Msg4 and the corresponding CR MAC CE are to resolve the possible contention of the contention-based RACH, such that waiting for the serving gNB to retrieve the UE context is not necessary. Thus, the serving gNB can transmit the CR MAC CE as early as possible (e.g., when the result of contention resolution is determined at the serving gNB), while the transmission of the response message to the RRCResumeRequest message from the UE can be performed by the serving gNB after receiving and processing the UE context. On the other hand, in other scenarios the Contention Resolution Identity MAC Control Element can be transmitted together with the RRC response message (e.g., the RRCRelease or RRCResume).

The sequence of steps for the single-SDT procedure as illustrated in FIG. 15 is as follows.

1. The UE, having small-data available for transmission, initiates the RACH to perform the small-data transmission. Correspondingly, the UE sends a preamble to the serving gNB.
2. In turn, the UE receives a temporary UE identifier (e.g., Temporary C-RNTI) and an uplink resource grant as the RAR from the serving gNB.
3. The UE then transmits the RRCResumeRequest message together with the UL small data, based on the previously-received UL grant. At substantially that point in time, the UE also starts a timer that is responsible for controlling the RRC resume request procedure, termed T319. More detailed information on the timer T319 will be provided below.

In more detail, according to the exemplary 5G-compliant implementations, the T319 timer regulates the maximum duration of an RRC resume request procedure. The timer T319 is started when transmitting the RRCResumeRequest message and is stopped when receiving a corresponding response thereto, such as the RRCRelease or RRCResume message. If T319 expires before being stopped, the UE will consider that the RRC resume request procedure has failed and will transition to the RRC_IDLE state.

Exemplarily, the value to be applied for the T319 is determined by the gNB, taking into account the time required for obtaining UE context(s) from other anchor gNBs. The longer T319 is, the later the serving gNB is allowed to send the response message (e.g., RRCRelease or RRCResume) to the UE. The value of T319 can for example be broadcast by the gNB in its cell using the system information (SIB) such that the T319 timer is cell-specific, and not UE-specific.

4. The serving gNB attempts to retrieve the context of the UE from the anchor gNB, based on the information content of the RRCResumeRequest message, which, e.g., includes a corresponding UE ID for the context retrieval (such as the Inactive-RNTI, I-RNTI).
5. The serving gNB, without waiting for the completion of the UE-Context retrieval, sends the Contention Resolution Identity MAC CE to the UE, which completes the RACH procedure. The UE receives this CR MAC CE, and compares the Contention Resolution Identity therein with the UE ID (e.g., I-RNTI) transmitted before to the serving gNB in the RRCResumeRequest message. If the two identities match, the contention is positively resolved.
6. As a result of the positive RACH contention resolution, the previously-received Temporary C-RNTI is now used by the UE as the C-RNTI.
7. Next, it is assumed that the serving gNB successfully retrieves the UE's context from the anchor gNB.
8. Then, the serving gNB determines how to respond to the RRCResumeRequest message, and in this exemplary case of FIG. 15 transmits an RRCRelease message to the UE so as to maintain the UE in RRC_Inactive. At the UE side, the UE stops the T319 timer, when receiving the RRCRelease message.
9. Furthermore, as a result of the RRCRelease message, the UE stays in RRC_INACTIVE and thus releases (can also be termed discards) the C-RNTI. On the other hand, the UE, e.g., would keep the C-RNTI when receiving an RRCResume message as the response to the previous RRCResumeRequest message of above step 3.

In order to support multi-SDT transmissions, the above sequence of steps, only involving a single-small-data transmission at step 3, may have to be extended. For instance, the UE may obtain additional suitable UL radio resources and then correspondingly perform one or more UL small-data transmissions.

However, in order for the UE to be able to receive uplink resource grants from the serving gNB, it would be advantageous that the UE has a valid C-RNTI (i.e., after the temporary C-RNTI is transformed to the C-RNTI) to which the uplink resource grants (such as a DCI of Format 0_0, 0_1, or 0_2) are addressed. In other words, the validity of the C-RNTI is important for the implementation of a multi-SDT procedure. Whether or not the C-RNTI is kept by the UE however depends on the response received by the UE relating to the initiated RRCResumeRequest as well as on the operation of timer T319, as apparent from above.

More specifically, the C-RNTI of the UE will be released in case the UE receives an RRCRelease message (see above step 8) or in case the T319 expires (e.g., before reception of the RRCRelease message). For instance, the current TS 38.331 standard defines the UE actions when receiving the RRCRelease message in its section 5.3.8.3, where the UE actions involve the release of the C-RNTI (e.g., as part of the MAC reset). Moreover, the current TS 38.331 standard also defines, e.g., the UE actions when the T319 timer expires, namely in section 5.3.13.5, where the UE actions involve the transition to RRC_IDLE, which in turn (see section 5.3.11 of TS 38.331) again involves the release of the C-RNTI (e.g., as part of releasing all resources, such as the RLC entity, MAC configuration, etc.).

In summary, the C-RNTI of the UE will be kept valid in the UE, while the T319 time is running and until the RRCRelease message is received. Consequently, the C-RNTI is only available for a particular amount of time, which could be insufficient for the UE to perform the multi-SDT procedure.

One possible solution could be to implement the additional one or more small-data transmissions at the earliest time that is reasonably possible, e.g., after the UE receives the contention resolution of Msg4 (see FIG. 15 and explanation of step 5) but before the reception of the RRCRelease message. Such a solution is illustrated in FIG. 16, which is similar to FIG. 15 and makes corresponding assumptions.

In such a solution, the serving gNB transmits uplink grants to the UE, addressed to the C-RNTI, and the UE in turn performs the corresponding small-data uplink transmissions using the assigned uplink radio resources, before the RRCRelease message is transmitted by the serving gNB.

The small-data transmissions could be optionally transmitted together with a buffer status report, such that the serving gNB is aware of how much further data is in the UE buffer and can then decide if another small-data transmission is necessary and, if so, create the next UL grant accordingly.

Figure 16:
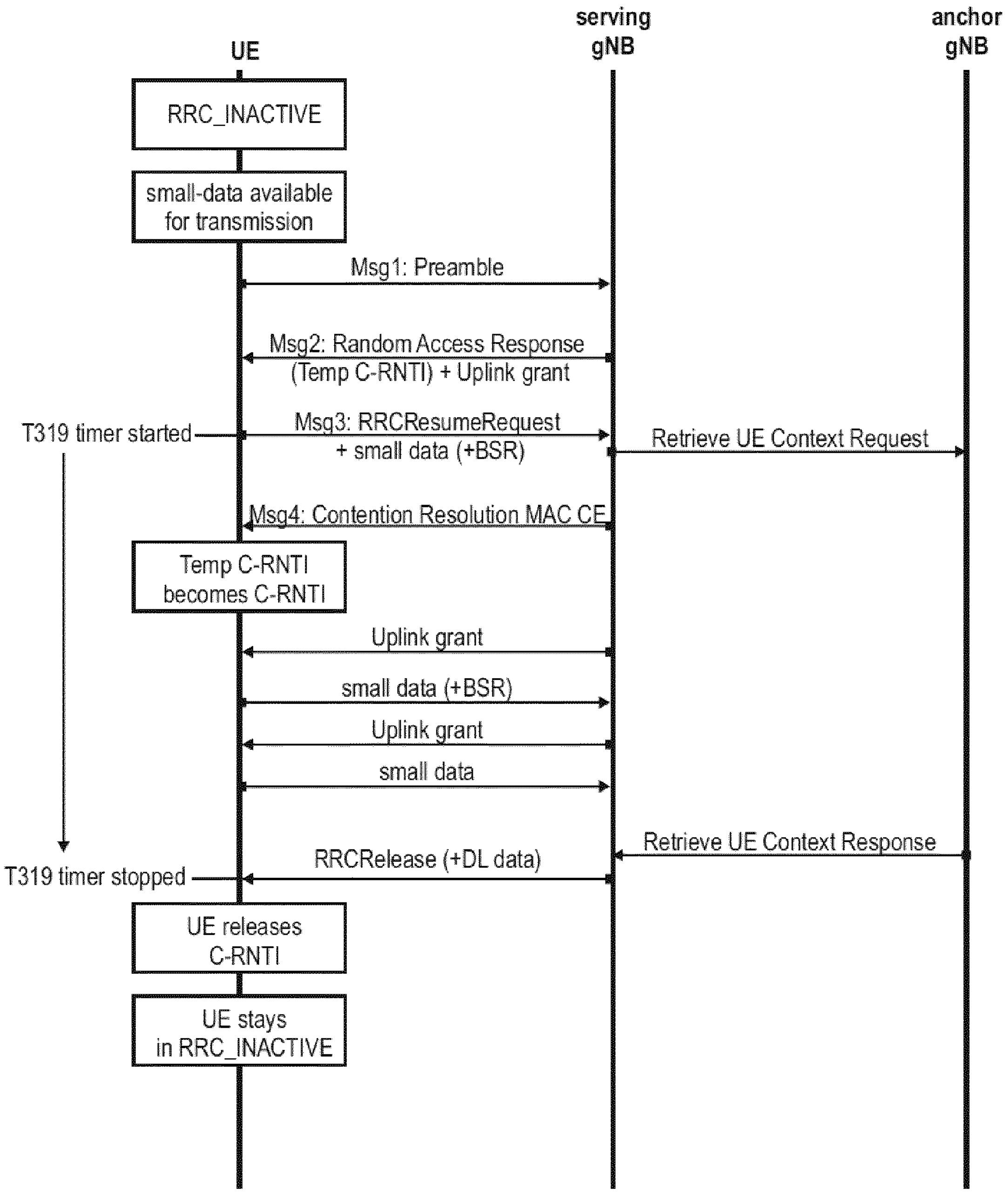
FIG. 16 illustrates an exemplary SDT procedure including multiple transmissions of small data during the RACH procedure.

Thus, according to the solution of FIG. 16, the small-data transmissions can be effectively and quickly implemented.

Such a solution however might involve the disadvantage that the UE is not yet authenticated by the serving gNB, because it has not yet received the UE context from the anchor gNB. Generally, it would be preferable that the UE is first authenticated by the serving gNB (based on the UE Context), before UL radio resources are actually reserved and assigned to such a new UE. For instance, the UE context retrieval could fail or reveal that the UE is fraudulent or fake, such that the assigned radio resources intended for the UL SDT could have been wasted.

Furthermore, in the exemplary scenario of FIG. 16, it is assumed that two additional small-data transmissions (three SDT in total) are possible, before the UE context is retrieved and the gNB sends the RRCRelease message to the UE. The UE then would stop the T319 timer and release the C-RNTI. Further UL small data transmission would then not be possible anymore. However, the amount of time available would be dependent on the time necessary for the UE context retrieval, which can vary a lot and be in fact quite brief.

A possible variation of the discussed solution could involve that the gNB waits with the transmission of the RRCRelease message, so as to avoid that the UE discards the C-RNTI. For instance, the gNB could wait such that the RRCRelease message is received just in time by the UE to stop the T319 timer and thus avoid the failure of the RRCResumeRequest procedure and thus possibly the transition to the RRC_IDLE state. This would maximize the time available for the small-data transmissions, being somewhat independent from when the UE context is actually received by the serving gNB. The waiting time by the serving gNB is however limited by the value of the T319 timer, because the RRCRelease should be transmitted by the serving gNB in time to be received by the UE before expiry of the T319 timer. Thus, there might not be time sufficient for performing the necessary number of small-data transmissions. In current 3GPP 5G-compliant implementations, the T319 timer can be set to a maximum of 2000 ms (see TS 38.331 v16.1.0 section 6.3.2 Information Element "UE-TimersAndConstants": "ENUMERATED {ms100, ms200, ms300, ms400, ms600, ms1000, ms1500, ms2000}"). This maximum of 2000 ms was defined to be able to cope with the UE-context retrieval from another gNB including a possible delay due to the backhaul link between the serving gNB and the anchor gNB that keeps the UE context for the inactive UE. The maximum value of the T319 timer was not designed to accommodate the multi-SDT procedure and thus is likely to be too small.

As a further optional variant of the above solution(s) (based on FIG. 16), the length of the T319 timer can be extended, i.e., made longer. In said respect, the maximum that the T319 timer can be possibly defined could be set much higher (e.g., 8000 ms). This would have the benefit that an improved multi-SDT procedure could allow the UE to keep the C-RNTI longer valid and thus allow more time for the multiple small-data transmissions before receiving the RRCRelease message.

However, setting the T319 timer to a higher value has also disadvantages, because other UEs that neither perform nor possibly even support multiple small-data transmissions would be negatively impacted. The value of the T319 timer is broadcast by the serving gNB in its cell as part of the system information and is adopted by all UEs, including those UEs that do not perform or support multi-small-data transmissions, also including those UEs that just intend to perform RNA (RAN-based notification area update) or intend to resume their RRC connections. The extended T319 timer value thus negatively impacts the RRCResumeRequest procedure of those UEs, because the UEs then detect a possible failure of said procedure at a later point in time when the T319 timer expires.

The multi-SDT procedure can last much longer than the single-SDT transmission procedure. In particular, the multi-SDT transmission procedure may involve the transmission of several subsequent UL grants after the first UL SDT transmission (see also FIGS. 13 and 14). This is likely to substantially prolong the multi-SDT procedure, e.g., when compared to the above-discussed single-SDT transmission procedure.

In RAN2 #111_e meeting, it was agreed that small data transmissions (SDTs) are configured by the network on a per data radio bearer (DRB) basis. More specifically, the arrival of SDT DRB traffic in RRC_INACTIVE will trigger the SDT procedure, whereas the arrival of non-SDT DRB traffic in RRC_INACTIVE will trigger the legacy RRC resume procedure (asking to go back to RRC_CONNECTED). In other words, the arrival of data in a DRB that is configured by the network (e.g., by the base station) to allow transmission of data in an inactive state will trigger the SDT procedure, whereas the arrival of data in a DRB that is not configured by the network will trigger the UE to initiate a (legacy) RRC resume procedure in order to enter a connected state. In RAN2 #112_e meeting, it was further agreed that UE shall suspend all DRBs upon entering RRC_INACTIVE, and only SDT DRBs are resumed (by the UE) upon initiating an SDT procedure.

The term SDT procedure or procedure for transmitting SDT DRB data thus refers to a procedure to transmit data in an inactive state (e.g., RRC_INACTIVE), and not necessarily to the amount of the data transmitted by the SDT procedure. Accordingly, the term small data and SDT DRB data refer to data that can be transmitted in an inactive state (of the UE), and not necessarily to the size of said data. In particular, small data or SDT DRB data may be any data of a DRB that is configured for transmission in an inactive state (such a DRB is here also referred to as a SDT DRB). Likewise, the term non-SDT DRB data refers to data that cannot be transmitted in an inactive state (of the UE) and/or data that can only be transmitted in an connected state (of the UE). In particular, non-SDT DRB data may be any data of a DRB that is not configured for transmission in an inactive state (such a DRB is here also referred to as a non-SDT DRB).

A procedure for transmitting SDT DRB data may be a procedure based on and/or initiated in a RACH procedure. In particular, said RACH procedure may be a 4-step RACH or a 2-step RACH procedure. More specifically, an SDT procedure based on a RACH procedure here refers to an SDT procedure initiated in a RACH procedure. This includes SDT procedures in which only a single transmission of small data is performed. E.g., during the RACH procedure as shown in FIGS. 13 to 15, but also SDT procedures in which more than one transmission of small data is performed during and/or following the RACH procedure as shown in FIG. 16. Furthermore, this also includes SDT procedures that do not terminate together with the RACH procedure in which they were initiated, as illustrated in FIG. 17.

Figure 17:
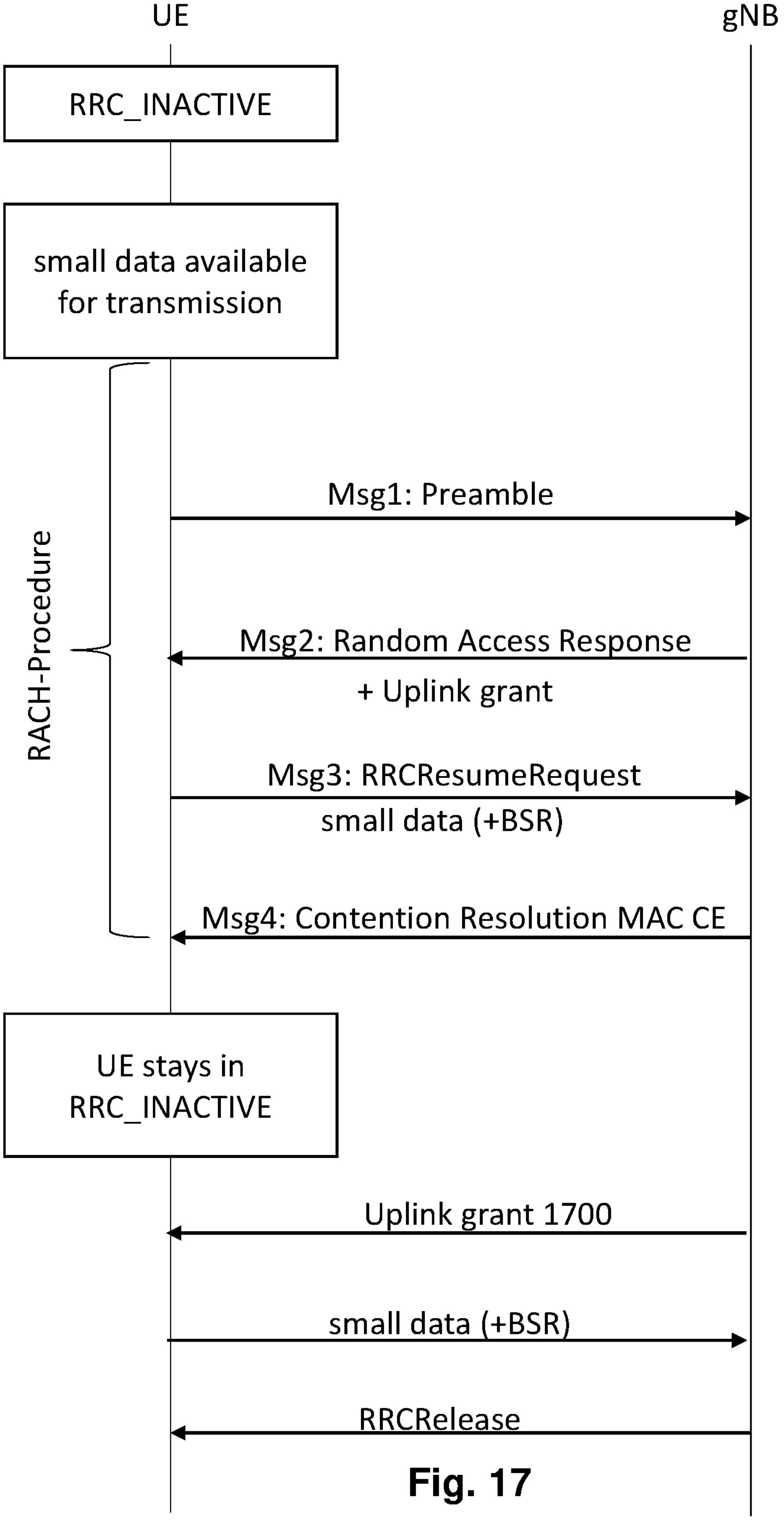
FIG. 17 illustrates an exemplary SDT procedure including transmission of small data during and after termination of the RACH procedure.

More specifically, FIG. 17 shows a multi-SDT procedure, i.e., a SDT procedure including more than one transmission of small data that is based on a 4-step RACH procedure. As can be appreciated from the figure, the SDT procedure of FIG. 17 does not terminate together with the RACH procedure, but continues after reception of Msg4. More specifically, the UE receives the UL grant 1700 after reception of Msg4, and performs transmission of small data using the UL grant 1700. In FIG. 17, there is only one small data transmission before and only one small data transmission after termination of the RACH procedure. However, in general there may be multiple transmissions of small data before and/or after termination of the RACH procedure.

Summarizing, an SDT procedure based on or initiated in a RACH procedure may thus be a procedure in which one or more transmissions of data are performed in an inactive state, and i) at least one of said one or more transmissions is performed, by the UE, together with a message of the RACH procedure, and/or ii) an indication is transmitted, by the UE, together with a message of the RACH procedure, the indication indicating a request for a resource grant for small data transmission.

However, the term SDT procedure is not limited to RACH based SDT procedures, as it also includes data transmissions in an inactive state that use a configured grant (CG). More specifically, the UE may initiate a CG-based SDT procedure by transmitting, using configured CG resources, a corresponding indication to the scheduling device. The UE may start transmission of the SDT DRB data together with the transmission of the indication or with a later transmission, which may also use CG resources. For instance, upon arrival of SDT DRB data, the UE may multiplex the SDT DRB data with a RRCResumeRequest message and transmit them in the nearest CG resource. The CG resources are those UL grants that appear periodically and are configured to the UE before/upon UE entering into inactive state by a scheduling device.

Data Connections

The term "data connection" used herein can be understood as connection over which a transmission of data (e.g., small data) is possible. e.g., between a UE and a radio base station. In more detail, a UE without a data connection, e.g., even if connected with the radio base station based on a signaling connection, cannot immediately transmit data. Data in this context can be understood broadly as user data, e.g., from an application running on the UE, in contrast to, e.g., control information which would be rather transmitted using a signaling connection.

In one exemplary implementation, according to the 5G NR standard, the data connection can be understood as a data radio bearer, DRB, and the signaling connection can be understood as a signaling radio bearer, SRB.

In some instances, the present application further distinguishes between different conditions of a data connection, e.g., non-existent, existent but suspended, existent but not used (could also be termed non-suspended or inactive), existent and currently used to transmit data (could also be termed active). Following this categorization of the data connection, a suspended data connection, although it exists, cannot be used immediately to transmit data (e.g., in the uplink), because it is suspended by both endpoints (e.g., the UE and the radio base station) and needs to be resumed first. On the other hand, a non-suspended data connection may allow an immediate data transmission (e.g., without any further procedure such as resuming the data connection). For example when referring to an exemplary 5G NR implementation as currently defined in the 3GPP standards, the UE in the RRC Inactive state will have one or more suspended data connections (DRBs are suspended); the UE in the RRC Connected state may have one or more active data connections and possibly other non-suspended data connections (that are currently not actively used); and the UE in the RRC Idle state will not have a data connection (neither suspended nor active). On the other hand, according to the improved data transmission procedure explained in the following, different from the currently defined 5G NR implementation in the 3GPP standards, the UE in the RRC Inactive state will have one or more non-suspended data connections available (these will be inactive because no data is being exchanged, until the small data transmission).

In this context, the present application explains that a data connection is used, e.g., by the UE to transmit the small data. In the present scenarios, the data connection is established between the UE and the base station. In one exemplary implementation, a data connection is to be broadly understood as being associated with certain parameters, relating to coding, security, encryption, etc. Thus, from the transmitting side perspective, the UE applies these parameters associated with that data connection to the (small) data to be transmitted using this data connection. This may be done, e.g., to ensure a particular Quality of Service. Correspondingly, from the receiving side perspective, the receiver may need to apply the converse processing (e.g., relating to coding, security, encryption, etc.) as in the transmitting side, so as to successfully decode the data transmitted via the data connection.

Terminology

In the following, UEs, base stations, and procedures will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

Embodiments

In general, upon arrival of non-SDT data during an SDT procedure, a UE in RRC_INACTIVE may i) trigger an RACH procedure for entering the connected state regardless of other circumstances, which may be an inefficient approach that decreases the overall system performance and/or ii) trigger RACH procedures for indicating the arrival of non-SDT data, based on causes or conditions that do not yet exist in the current specification, which may require a lot of efforts to change the specification.

In view thereof, the present disclosure provides techniques enabling an efficient handling of the arrival of non-SDT DRB data during an SDT procedure. In particular, the disclosed procedures enable using transmission opportunities already occurring for the transmission of small data also for the transmission of a traffic indication indicating the arrival of non-SDT DRB data. Using an already transmission opportunity may avoid requiring another UL grant for the UE to transmit the indication of the non-SDT data arrival and/or initiation of an additional RACH procedure for entering a connected state and, thus, save UE power, reduce the overhead and avoid collision with other UEs.

The present disclosure provides a base station and a user equipment. As illustrated in FIG. 18, user equipment 1810 and base station 1860 may communicate with each other over a wireless channel in a wireless communication system. For instance, the user equipment may be a NR user equipment, and the base station may be a network node or scheduling node such as a eNB, or a NR gNB, in particular a gNB in a Non-Terrestrial Network (NTN) NR system. The present disclosure further provides a system including a scheduled and scheduling device, as well as a corresponding methods and programs. An example of such communication system is illustrated in FIG. 18. The communication system 1800 may be a wireless communication system in accordance with the technical specifications of 5G, in particular a NR communication system. However, the present disclosure is not limited to 3GPP NR and may also be applied to other wireless or cellular systems such as NTNs. FIG. 18 illustrates a general, simplified and exemplary block diagram of a user equipment 1810 (also termed communication device) and a scheduling device 1860 which is here exemplarily assumed to be located in the base station (network node). However, in general, a scheduling device may also be a terminal in case of a sidelink connection between two terminals. Moreover, in particular with respect to the use cases of URLLC; eMBB, and mMTC, the communication device 1810 may also be a sensor device, a wearable device, or a connected vehicle, or a controller of an automated machine in an industrial factory. Further, a communication device 1810 may be able to function as a relay between base station 1860 and another communication device (e.g., the disclosure is not limited to communication "terminals" or user "terminals").

The UE and eNB/gNB are communicating with each other over a (wireless) physical channel 1850 respectively using their transceivers 1820 (UE side) and 1870 (base station side). Together, the base station 1860 and the terminal 1810 form the communication system 1800. The communication system 1800 may further include other entities such as those shown in FIG. 1.

As shown in FIG. 18 (left-hand side), according to an exemplary embodiment, a user equipment (UE) 1810 is provided. The UE 1810 comprises a transceiver 1820 and circuitry 1830. The circuitry 1830, in operation, detects, while in a procedure for transmitting SDT DRB data in an inactive state, that non-SDT DRB data are to be transmitted in a connected state. The circuitry 1830, in operation, determines whether or not there is a transmission opportunity to wait for. When it is determined that there is no transmission opportunity to wait for or the transmission opportunity to wait for is no longer expected to occur, the circuitry, in operation, initiates a random access channel (RACH) procedure for entering a connected state. When it is determined that there is the transmission opportunity to wait for and said transmission opportunity occurs, the circuitry, in operation, controls the transceiver to transmit, using said transmission opportunity, a traffic indication indicating the detection of the non-SDT DRB data.

FIG. 19 shows an exemplary functional structure of the circuitry 1830, i.e., the circuitry handling the arrival of non-SDT DRB data. As shown, the arrival of non-SDT DRB data handling traffic indication handling circuitry 1830 may include a non-SDT DRB data detection circuitry 1936 and a transmission opportunity judging circuitry 1937. More specifically, circuitry 1936 detects non-SDT DRB data. e.g., by detecting or determining whether or not there is non-SDT DRB data that is to be transmitted. Circuitry 1936 may also determine whether or not the arrival of non-SDT DRB is expected. The transmission opportunity judging circuitry 1937 may determine whether or not there is a transmission opportunity to wait for. Additionally, if it determines that there is a transmission opportunity to wait for, circuitry 1937 may also determine the transmission opportunity to wait for (e.g., the resources of said transmission opportunity).

Figure 21:
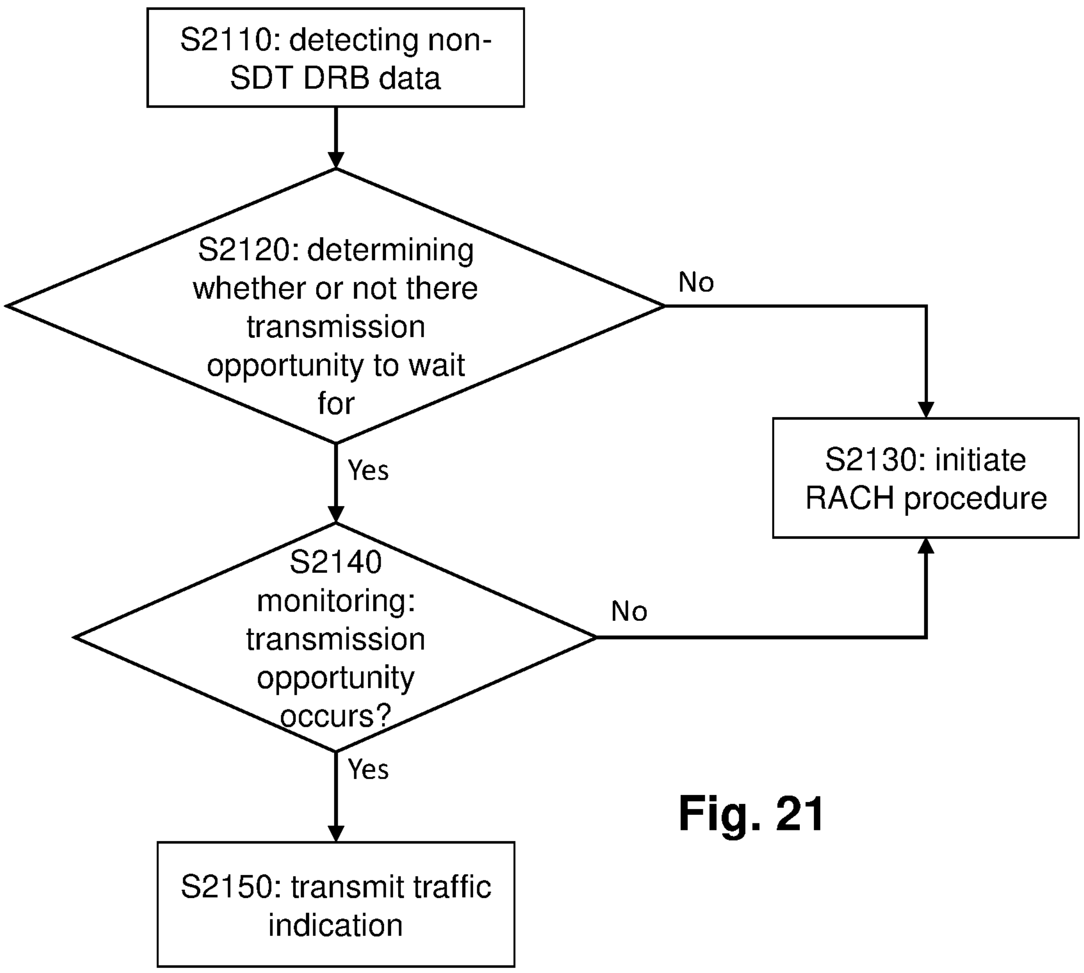
FIG. 21 is a flow chart illustrating exemplary steps performed by a user equipment.

In correspondence with the above described UE, according to another exemplary embodiment, a communication method to be performed by a UE is provided. As shown in FIG. 21, the method comprises the steps of:

detecting S2110, while in a procedure for transmitting SDT DRB data in an inactive state, that non-SDT DRB data are to be transmitted in a connected state;

determining S2120 whether or not there is a transmission opportunity to wait for;

when it is determined S2120 that there is no transmission opportunity to wait for or the transmission opportunity to wait for is no longer expected to occur (No in S2140), initiating S2130 a random access channel, RACH, procedure for entering a connected state; and when it is determined S2120 that there is the transmission opportunity to wait for and said transmission opportunity occurs (Yes in S2140), transmitting S2150, using said transmission opportunity, a traffic indication indicating the detection of the non-SDT DRB data.

As also shown in FIG. 18 (right-hand side), according to another exemplary embodiment, a scheduling device 1860 is provided. The scheduling device 1860 comprises a transceiver 1870 and a circuitry 1880. The circuitry 1880, in operation, controls the transceiver to receive, from a user equipment (UE) in an inactive state, a transmission including SDT DRB data. The circuitry 1880, in operation, obtains, from the received transmission including the SDT DRB data, a traffic indication. The traffic indication indicates the detection, by the UE, of non-SDT DRB data. The non-SDT DRB data are data to be transmitted by the UE in a connected state, the traffic indication is signaled by a predefined value of a logical channel ID (LCID) in a MAC subheader, and the predefined value of the LCID indicates that the non-SDT DRB data have been detected.

FIG. 20 shows an exemplary functional structure of the traffic indication handling circuitry 1885. In particular, the traffic indication handling circuitry 1885 may include a traffic indication evaluation circuitry 2036 and an RRC state transition circuitry 2037. Circuitry 2036 may be responsible for obtaining and interpreting the traffic indication from the transmission including the small data. Furthermore, when circuitry 2036 obtains a traffic indication from the received transmission, circuitry 2037 may be responsible for sending an RRC message to the UE for transferring the UE from the inactive state to a connected state.

Figure 22:
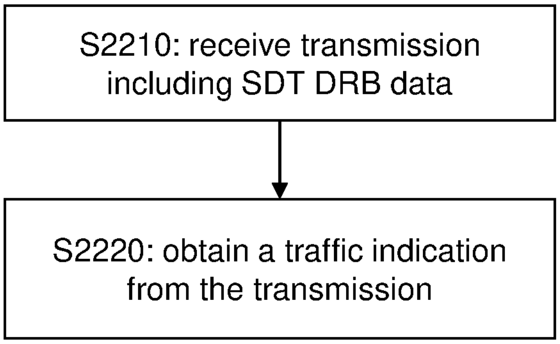
FIG. 22 is a flow chart illustrating exemplary steps performed by a network node.

Furthermore, in correspondence with the above described base station, a communication method to be performed by a scheduling device is provided. As shown in FIG. 22, the method comprising the steps of:

receiving S2210, from a user equipment, UE, in an inactive state, a transmission including SDT DRB data; and obtaining S2220, from the transmission including the SDT DRB data, a traffic indication indicating the detection, by the UE, of non-SDT DRB data, wherein i) the non-SDT DRB data are data to be transmitted by the UE in a connected state, ii) the traffic indication is signaled by a predefined value of a logical channel ID, LCID, in a MAC subheader, and iii) the predefined value of the LCID indicates that the non-SDT DRB data have been detected.

The communication device 1810 may comprise the transceiver 1820 and a (processing) circuitry 1830, and the scheduling device 1860 may comprise the transceiver 1870 and a (processing) circuitry 1880. The transceiver 1810 in turn may comprise and/or function as a receiver and/or a transmitter. In this disclosure, in other words, the term "transceiver" is used for hardware and software components that allow the communication device 1810, or, respectively base station 1860 to transmit and/or receive radio signals over a wireless channel 1850. Accordingly, a transceiver corresponds to a receiver, a transmitter, or a combination of receiver and transmitter. Typically, a base station and a communication device are assumed to be capable of transmitting as well as receiving radio signals. However, particularly with respect to some applications of eMBB, mMTC and URLLC (smart home, smart city, industry automation, etc.), cases are conceivable in which a device, such as a sensor, only receives signals. Moreover, the term "circuitry" includes processing circuitry formed by one or more processors or processing units, etc. The circuitries 1830 and 1880 (or processing circuitries) may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data that is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

It is further noted that any of the steps/operations described below may be performed or controlled by the circuitry 1830 (on the UE side) and/or the circuitry 1880 (on the base station side).

In the further description, the details and embodiments apply to each of the transceiver device, the scheduling device (or scheduling nodes) and the methods unless explicit statement or context indicates otherwise.

Arrival of Non-SDT Data

At some point of time while the UE is in the inactive state, it is assumed that non-SDT DRB data becomes available for transmission such that the UE determines that a transmission of non-SDT DRB is to be performed. If, when detecting the arrival of the non-SDT DRB data, the UE is not in an SDT procedure, the UE may initiate a RACH procedure for entering the connected state. It is thus assumed that the UE is in an SDT procedure when detecting the arrival of the non-SDT DRB data.

Figure 23:
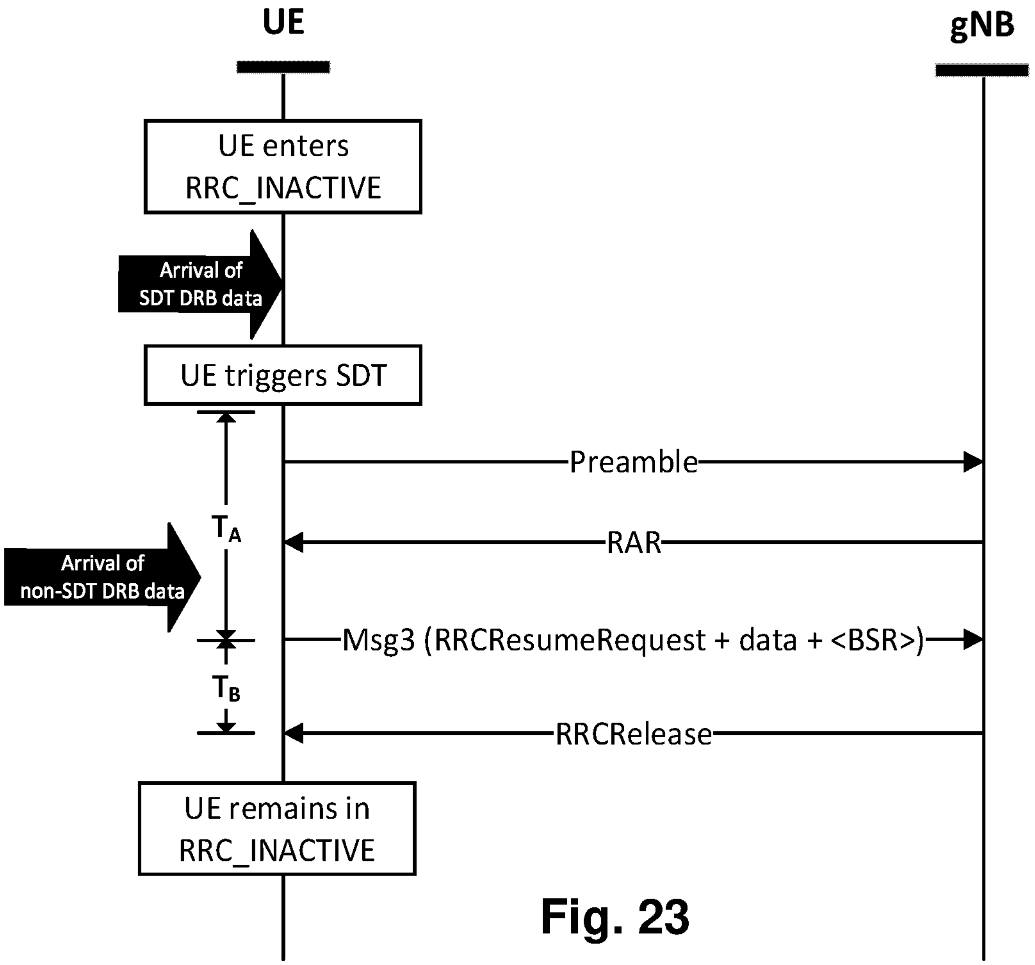
FIG. 23 illustrates different timings of arrival of non-SDT data during an SDT procedure.

As illustrated in FIG. 23, the statement that the UE is in an SDT procedure does not necessarily mean that the UE has already performed a transmission related to the SDT procedure, but rather that the UE has determined that (small) data are to be transmitted in an inactive state. The SDT procedure may thus start with the determination that (small) data are to be transmitted in an inactive state, may include a RACH procedure that initiates the SDT procedure, and/or may continue after said RACH procedure.

The term "arrive" here refers to an arrival from a higher layer. Thus, in other words, said non-SDT data becomes available for transmission. Furthermore, the term "detected" includes the detection of the actual arrival of the data as well as the detection/determination that non-SDT DRB data are expected to arrive for transmission.

As shown in FIG. 23, the non-SDT DRB data may arrive and/or be detected at a time $T_A$ or a time $T_B$. More specifically, the timing $T_A$ of the arrival of non-SDT traffic refers to a timing before the first transmission of small data (e.g., Msg3/MsgA). Alternatively or in addition, the timing $T_A$ may also be the period before the UE has performed all its RACH transmissions. Thus, if the non-SDT traffic arrives in the period at $T_A$, there will be at least one UL grant (or transmission opportunity) for the transmission of small data that the UE can utilize to indicate the arrival of non-SDT traffic. In particular, there will be a transmission opportunity as part of the RACH procedure. For instance, as shown in FIG. 23, $T_A$ may start when or shortly after the UE triggers the SDT procedure and may end with or shortly before the UE sends Msg3/MsgA. The timing $T_B$, on the other hand, refers to an arrival of non-SDT traffic after the first transmission of small data (e.g., Msg3/MsgA). Thus, if the non-SDT traffic arrives in the period at $T_B$, there could or could not be an UL grant that the UE can utilize to indicate the arrival of non-SDT traffic, depending on whether there is subsequent data transmission or not. For instance, as shown in FIG. 23, timing $T_B$ may start with the UE sending Msg3 and before UE receiving the RRCRelease message/MsgB. Moreover, it is noted that, although FIG. 23 shows that $T_B$ is a shorter period than $T_A$. $T_B$ can be the longer time period depending on the network decision.

When the arrival of non-SDT DRB data is detected, a new RRC Resume procedure using, e.g., a CCCH message may be initiated by the UE. Thus, even though there is an on-going RRC resume procedure (for SDT DRB data transmission), the UE may initiate a new RACH procedure and send the RRC Resume Request again in Msg3. However, it may represent an inefficient resource utilization and increase RACH collision with other UEs if a new RACH will be triggered regardless of whether or not there is an upcoming UL grant or transmission opportunity.

Accordingly, summarizing the handling in case of a RACH-based SDT procedure explained in further detail below: if the non-SDT traffic arrives at $T_A$, the UE may utilize the remaining transmission opportunity(s) to transmit the traffic indication. Furthermore, if the non-SDT traffic arrives at $T_B$, the UE may either i) send a non-SDT traffic indication to gNB in a dedicated UL resource(s) that is received before the end of the SDT procedure; or ii) initiate a new RACH procedure for entering the connected state (RRC resume procedure) if a dedicated UL resource(s) is not received or is not expected to be received. Moreover, the UE may also initiate a new RACH procedure if it (later) determines that an expected UL grant is no longer expected to be received or, in other words, no longer expects to receive the dedicated UL grant.

Transmission Opportunities

In general, the term transmission opportunity refers to an opportunity to transmit the traffic indication without initiating a new RACH procedure (e.g., a RACH procedure in addition to and different from the RACH procedure that is to initiate or already has initiated the SDT RB data transmission). A transmission opportunity is thus associated with resource(s) that may be used by the UE to transmit data. In general, these resources may be dedicated resources, indicated or expected to be indicated by a dedicated UL grant received as part of the SDT procedure, and/or resources used for a transmission of the RACH procedure (e.g., Msg3 or MsgA), as well as resources assigned to the UE via Configured Grant (CG). In particular, a transmission opportunity may be i) a transmission opportunity for transmitting at least part of the SDT DRB data, and ii) a transmission opportunity that is expected to occur as part of the procedure for transmitting the SDT DRB data.

1. Already Known Transmission Opportunities

In general, when determining whether or not to wait for a transmission opportunity, the resources of said transmission opportunity may be known to the UE.

In general, if the procedure for transmitting the SDT DRB data is a procedure initiated in a RACH procedure, the transmission opportunity to wait for may be a first transmission of the RACH procedure. For instance, if the SDT procedure is to be initiated in a 2-step RACH procedure, and the UE has no yet transmitted its first transmission (e.g., MsgA), the UE may use this first transmission to transmit the traffic indication. In other words, the UE may use RACH resources (e.g., resources of a RACH occasion) to transmit the SDT DRB data (or part thereof) and the traffic indication. The non-SDT DRB data may thus have been detected by the UE after the UE has triggered a RACH procedure (e.g., determined that a RACH procedure is to be started), and before transmitting the first transmission of said RACH procedure. For instance, the non-SDT data may arrive while the UE is waiting for the RACH resource(s) that is intends to use (e.g., the next). A transmission opportunity (to wait for or not to wait for) may then be given by said RACH resource(s).

Furthermore, in general, if the procedure for transmitting the SDT DRB data is a procedure initiated in a RACH procedure, the transmission opportunity may be an opportunity that has been indicated by an uplink grant received as part of the RACH procedure. For instance, the SDT procedure is (has been or is to be) initiated in a 4-step RACH procedure. In this case, the UE may have detected the non-SDT DRB data after receiving a random access response, but before transmitting the SDT DRB data (or part thereof) using the resources indicated by said random access response. For instance, the UE may already have received Msg2, but not yet transmitted Msg3. Thus, in general, the UE may have received an UL grant during the RACH procedure, which indicates a transmission opportunity (resources), e.g., for transmission of SDT data, which has not yet elapsed. The transmission opportunity (to wait for or not to wait for) may then be said transmission opportunity indicated by the UL grant.

Moreover, in general, if the procedure for transmitting the SDT DRB data is a procedure initiated in a RACH procedure, the transmission opportunity to wait have been indicated by an uplink grant received for transmitting the SDT DRB data after completion of the RACH procedure. For instance, the SDT procedure may have been initiated in RACH procedure (e.g., a 2-step or a 4-step RACH procedure). Said RACH procedure may be completed (e.g., the UE has already received a contention resolution MAC CE from the scheduling device), but the SDT procedure initiated in said RACH procedure may still be ongoing. In other words, the UE may still receive UL grants from the scheduling device for the transmission of SDT DRB data. When detecting the arrival of the non-SDT DRB data, the UE may have received such an UL grant indicating a transmission opportunity for transmission of SDT data, which has not yet elapsed. The transmission opportunity (to wait for or not to wait for) may then be said transmission opportunity indicated by the UL grant.

Monitoring Known Transmission Opportunity—S2140

After determining that there is a transmission opportunity to wait for, the UE may monitor S2140 said transmission opportunity. If the resource(s) of said transmission opportunity are already known to the UE, this may involve waiting S2140 for said transmission opportunity to occur. More specifically, the resources of said transmission opportunity may be somewhere in the future and, thus, the UE has to wait until it can use said resources for transmission of the traffic indication. However, the monitoring may here also involve monitoring whether said transmission opportunity is cancelled or preempted by the base station before it occurs, in which case the UE may initiate a new RACH procedure for entering the connected state.

2. Transmission Opportunities to be Indicated by an Expected Uplink (UL) Grant

In general, when determining whether or not to wait for a transmission opportunity, the resources of said transmission opportunity may not be known to the UE. In this case, the UE may expect that it will receive, from the scheduling device, an UL grant specifying the resources of said transmission opportunity. As further explained below, there are several scenarios in which the UE may expect to receive an UL grant from the scheduling device.

In general, the transmission opportunity to wait for may be expected to be indicated by an uplink grant. Furthermore, in general, the UE may expect to receive said UL grant indicating resources for the transmission of SDT data as part of the SDT procedure. As further explained below, a (expected) uplink grant may be expected to be received as part of the RACH procedure initiating the SDT procedure or expected to be received not as part of the RACH procedure (but still as part of the SDT procedure). In other words, the UL grant may also be an UL grant that is expected to be received for transmitting SDT DRB data or part of the SDT DRB data after completion of the RACH procedure.

For instance, an uplink grant may be expected to be received after the circuitry has controlled the transceiver to transmit a first transmission of the RACH procedure. In particular, the RACH procedure may be a 4-step RACH procedure and, after transmitting Msg1, the UE is expecting to receive a UL grant with Msg2.

Alternatively or in addition, an uplink grant may be expected to be received after the circuitry has controlled the transceiver to transmit a buffer status report (BSR) indicating an amount (e.g., a non-zero amount) of the SDT DRB data that is still to be transmitted. This BSR may have been sent as part of the RACH procedure (e.g., in MsgA or Msg3), or after completion of the RACH procedure together with part of the SDT DRB data. For instance (as illustrated in FIG. 17), the UE may have sent not the entire SDT DRB data in MsgA/Msg3 (e.g., on account of the size of the SDT DRB data). Accordingly, the UE may have segmented the SDT DRB data and transmitted only part of the SDT DRB data, and a BSR indicating a non-zero size of remaining SDT DRB data in MsgA/Msg3. Then UE may then wait for and/or expect further uplink grants (not part of the RACH procedure anymore) for transmitting the remaining parts of the SDT DRB data.

Moreover, alternatively or in addition, an uplink grant may be expected to be received after the circuitry has controlled the transceiver to transmit, after transmitting the BSR, part of the SDT DRB data, wherein an amount of the part of the SDT DRB data is smaller than an amount indicated by the BSR. In other words, after transmitting a BSR for the SDT DRB data, the UE may expect UL grants until it has transmitted (successfully), since transmission of said BSR, SDT DRB data of the size indicated by said BSR.

Monitoring Transmission Opportunity—S2140

After determining that there is a transmission opportunity to wait for, the UE may monitor S2140 said transmission opportunity. If the resource(s) of said transmission opportunity are expected to be indicated by an UL grant, this may involve waiting S2140 for said UL grant. This waiting my, in turn, include monitoring the PDCCH for the UL grant. If the UL grant is received, the UE may continue waiting for the transmission opportunity as already explained above.

However, in general, a UE may not receive an expected uplink grant. Correspondingly, when monitoring S2140 whether the transmission opportunity occurs, the UE may determine under certain conditions that an expected uplink grant is no longer expected to be received and/or that the opportunity is no longer expected to occur. In particular, a transmission opportunity to wait for may no longer be expected to occur when the expected uplink grant has not been received and is no longer expected to be received. Correspondingly, the UE may then determine that the transmission opportunity does not occur and/or initiate a (new) RACH procedure for entering the connected state. In particular, if the UE has not received the UL grant upon receiving RRCRelease message, the UE may initiate a RRC resume procedure. In particular, the UE may then initiate a legacy RRC resume procedure immediately (e.g., without waiting for termination of the SDT procedure and/or the RACH procedure initiating said SDT procedure).

For instance, an expected uplink grant may no longer be expected to be received if the transceiver receives an indication indicating termination of the procedure for transmitting the SDT DRB data. Here it should be noted that this indication indicating the termination of the SDT procedure may be the reception of Msg4 or MsgB. However, as mentioned above, the RACH procedure may in general terminate earlier than the SDT procedure. More specifically, as also illustrated in FIG. 17, the RACH procedure generally terminates when contention resolution has been resolved, whereas the SDT procedure generally terminates when the RRCRelease message is received. Thus, the indication indicating the termination of the SDT procedure may also be an RRCRelease message received from the base station.

In general, alternatively or in addition, an expected uplink grant may no longer be expected to be received if a predetermined time has elapsed since a first or previous transmission of at least part of the SDT DRB data. For instance, the predetermined time may be given by the T319 timer or T319-like timer explained above. However, the predetermined time used by the UE for determining whether an UL grant is still expected to be received may be another predetermined period of time the UE waits for the reception of an UL grant.

Determining Whether or not there is a Transmission Opportunity to Wait for (S2120)

1. RACH Procedure

If the non-SDT traffic arrives during a RACH-based SDT procedure, the UE may determine that there is a transmission opportunity to wait for if it has not yet transmitted the first transmission of the RACH procedure (in other words, non-SDT traffic arrival in $T_A$). The UE may then wait S2140 for the transmission opportunity and transmit the traffic indication using said transmission opportunity.

Furthermore, the UE may determine that there is a transmission opportunity to wait for if the non-SDT traffic arrives at $T_B$ and the UE expects that an UL grant is going to be assigned by gNB (i.e., BSR is sent before but gNB has not assigned grant for BSR for SDT DRB). In particular, the UE may determine that the resources of said transmission opportunity to wait for are specified by said expected UL grant. The UE may then wait S2140 for the coming UL grant and sends the non-SDT traffic indication to gNB in that grant.

However, in general, if the non-SDT traffic arrives at $T_B$, the UE may have not have a further UL grant to send the DCCH, and hence may need to initiate a new RACH for just sending the DCCH. Thus, another UL grant is required for UE to transmit the indication if only SDT DRB can be sent in SDT procedure. Accordingly, if the non-SDT traffic arrives during a RACH-based SDT procedure, the UE may determine that there is no transmission opportunity to wait for if it has transmitted the first transmission of the RACH procedure and it does not expect to receive a UL grant. In particular, the UE may determine that there is no transmission opportunity to wait for after it has transmitted (all) the SDT DRB data (e.g., when circuitry 1830 has controlled the transceiver 1820 to transmit the SDT DRB data. Put differently, if the non-SDT traffic arrives at $T_B$ and the UE does not expect that an UL grant is going to be assigned by gNB (i.e., BSR is not sent before or has been resolved by gNB), the UE may determine that there is no transmission opportunity to wait for and initiate a legacy RRC resume procedure (immediately. e.g., without waiting for termination of the SDT procedure and/or the RACH procedure initiating said SDT procedure).

The handling of the arrival of non-SDT traffic during an RACH-based SDT procedure, including the determination S2120 whether there is a transmission opportunity to wait for, is summarized once again with reference to FIG. 24, which exemplarily illustrates said handling. More specifically, in FIG. 24, it is exemplarily assumed that SDT traffic arrived when the UE was in RRC_INACTIVE, and that the UE accordingly triggered S2410 an SDT procedure. It is further assumed that the UE already transmitted a RACH preamble of a 4-step RACH procedure for initiating the SDT procedure. It is noted that the term "triggered" here refers to an internal decision/determination of the UE to perform the SDT procedure, whereas the term "initiating" refers to the first message of the SDT procedure, which may make the scheduling device aware of the UE's decision to perform an SDT procedure. Thus, after S2410 the UE is in an RACH-based SDT procedure for transmitting small data. It is further assumed that subsequently non-SDT traffic arrives and/or is detected by the UE.

As can further be seen, when the non-SDT traffic arrives the UE may, first, determine whether or not the first RACH message has already been sent (whether "Y" or "N" in S2420). However, it is noted that, the UE may also, first, determine whether or not there is still an ongoing SDT procedure (whether "Y" or "N" in S2430), i.e., whether or not a message terminating the SDT procedure (e.g., an RRCRelease message) has already been received, which may imply both an "N" in S2420 and S2430. In other words, the UE may but does not necessarily have to perform the individual determinations associated with S2420. S2430. S2440 and 2450, and, in particular, does not have to perform these determinations in the specific order shown in FIG. 24.

Figure 24:
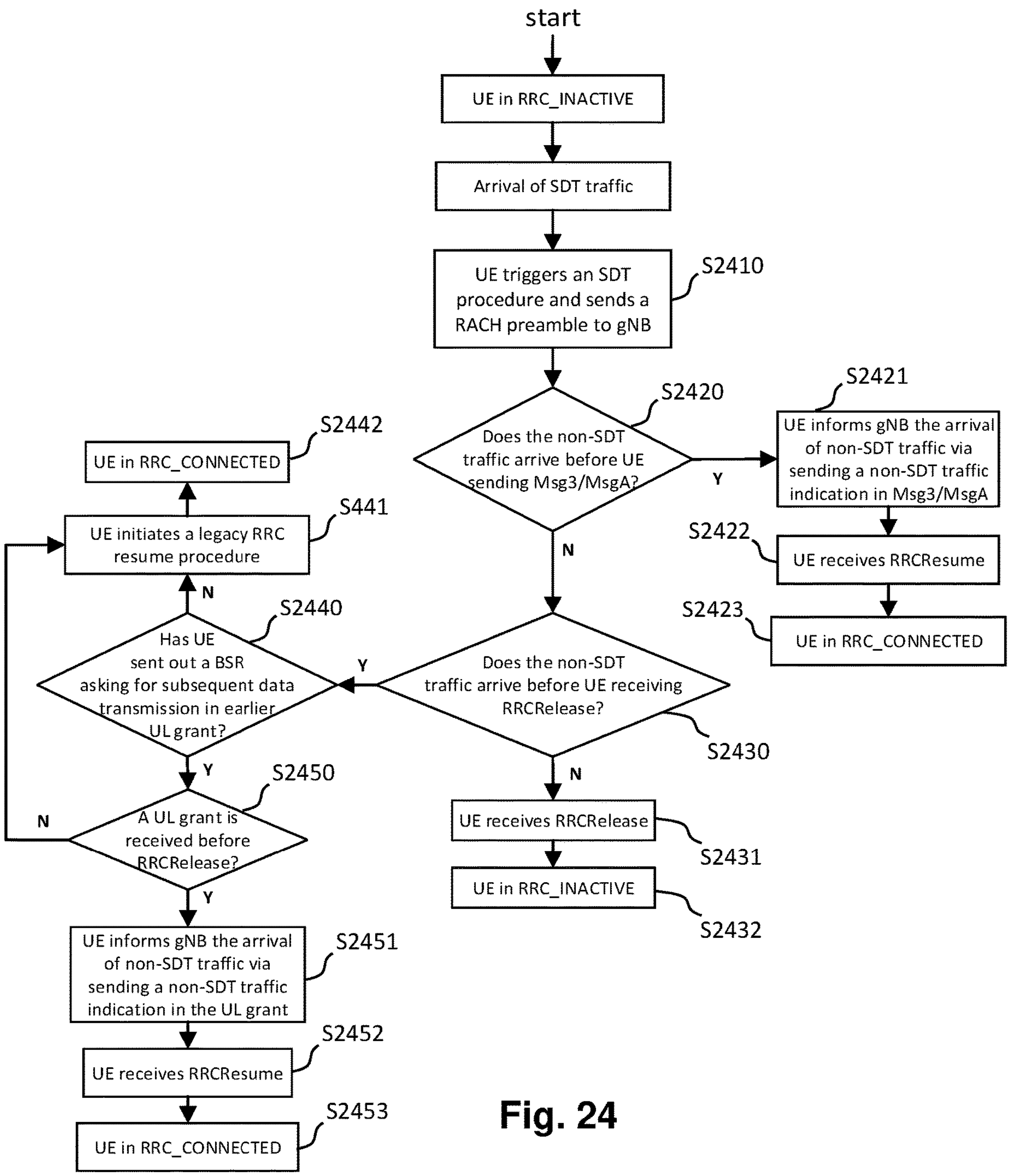
FIG. 24 is a flow chart illustrating exemplary steps performed by a user equipment.

As shown in FIG. 24, if the non-SDT traffic arrives before the UE has sent all its messages (e.g., has sent Msg3/MsgA) of the RACH procedure (Yes in S2420), the UE may include S2421 a traffic indication, indicating the detection of the non-SDT DRB data, in a subsequent RACH message. In other words, if the non-SDT DRB data is detected in the period $T_A$, the may determine that there is a transmission opportunity to wait for (namely the subsequent RACH message). As further indicated in FIG. 24, the scheduling device may, in response to the traffic indication, terminate the RACH procedure with an message indicating the transition to a connected state (e.g., a RRCResume message) rather than a message indicating the return to the inactive state (e.g., RRCRelease message). Accordingly, the UE may receive S2422 the message indicating the transition to the connected state and enter S2423 the connected state (e.g., RRC_CONNECTED state). The UE may then transmit the non-SDT DRB data.

As can further be seen, if the non-SDT traffic arrives after i) (No in S2420) the UE has sent all its messages of the RACH procedure (e.g., Msg3/MsgA), and ii) after (No in S2430) the UE has received S2431 a message terminating the SDT procedure, the UE is/remained S2432 in RRC_INACTIVE. In other words, the UE may determine that there is no transmission opportunity to wait for if a message terminating the SDT procedure has already been received and/or if there is no ongoing SDT procedure when the non-SDT DRB data is detected. Accordingly, the UE may initiate a RACH procedure (legacy RRC resume procedure) in order to enter a connected state and be able to transmit the non-SDT DRB data.

Furthermore, if i) the non-SDT traffic arrived after the UE has performed all its transmission of the RACH procedure ("N" in S2420), ii) the non-SDT traffic arrived before a message indicating termination of the SDT procedure has been received ("Y" in S2430), and iii) the UE has not transmitted a buffer status report indicating a non-zero buffer size of SDT DRB data ("N" in S2440), the UE may initiate S2441 a RACH procedure (legacy RRC resume procedure) in order to enter S2442 a connected state and be able to transmit the non-SDT DRB data. In particular, the UE may determine that there is no transmission opportunity to wait for if i) the UE has performed transmission of all of its transmissions of the RACH procedure and ii) it has not transmitted a buffer status report indicating a non-zero buffer size of SDT DRB data. Likewise, the UE may determine that there is no transmission opportunity to wait for if it has transmitted a BSR, but has already received the corresponding UL grants and used them to transmit the small data (used them to transmit data of the size indicated in the BSR).

If, on the other hand, i) the non-SDT traffic arrived after the UE has performed all its transmission of the RACH procedure ("N" in S2420), ii) the non-SDT traffic arrived before a message indicating termination of the SDT procedure has been received ("Y" in S2430), and iii) the UE has transmitted a buffer status report indicating a non-zero buffer size of SDT DRB data ("Y" in S2440), the UE may determine that there is a transmission opportunity to wait for (namely, the transmission that is expected to be indicated by the UL grant that is expected to be received in response to said BSR). The UE may thus wait for said UL grant and/or monitor the PDCCH.

If said expected UL grant is received before the SDT procedure in terminated by a corresponding message from the base station ("Y" in S2450), the UE may include S2451 a traffic indication, indicating the detection of the non-SDT DRB data, in the transmission that uses the resources indicated by the UL grant. The reception of the UL grant may imply that the transmission opportunity to wait for does occur. In response to the traffic indication, the scheduling device may terminate the SDT procedure with a message indicating the transition to a connected state (e.g., an RRCResume message) rather than a message indicating the return to the inactive state (e.g., an RRCRelease message). Accordingly, the UE may receive S2452 the message indicating the transition to the connected state and enter S2453 the connected state (e.g., RRC_CONNECTED state). The UE may then transmit the non-SDT DRB data.

If, on the other hand, the UE receives a message terminating the SDT procedure (e.g., an RRCRelease message)

before it receives the UL grant ("N" in S2450), the UE may initiate a new RACH procedure as already explained above under S2441 and S2442. This may include determining that the expected UL grant is no longer expected any may imply that the transmission opportunity to wait for does not occur.

2. Configured Grant (CG) Procedure

As already mentioned above, the procedure for transmitting the SDT DRB data may be a configured grant (CG) procedure for transmitting the SDT DRB data. As explained in more detail below, if non-SDT DRB traffic arrives during an CG-based SDT procedure, the UE may either i) send a non-SDT traffic indication to gNB in a dedicated UL resource that is received before the end of the SDT procedure; or ii) initiate a legacy RRC resume procedure. Here the dedicated UL resource may be a CG resource with which the UE has been configured, before/upon entering the inactive state, for transmitting SDT DRB data.

When the UE (e.g., by circuitry 1830, 1835 and/or 1936) detects the arrival of non-SDT DRB data during a CG-based SDT procedure, it may be determined. (e.g., by circuitry 1830, 1835 or circuitry 1937 as part of step S2120), if a next resource of the CG procedure is earlier than a next (in time-domain) RACH resource, that there is a transmission opportunity to wait for. In particular, this may include determining that the next resource(s) of the CG procedure is the transmission opportunity to wait for. The UE (e.g., the relevant circuitry) may then transmit a traffic indication using said next CG resource(s). For instance, after waiting S2140 (as already explained above) for said transmission opportunity, the UE (e.g., circuitry 1830) may control the transceiver to transmit, using said transmission opportunity, the traffic indication.

If, on the other hand, the next resource of the CG procedure is later than the next RACH resource, it may be determined (e.g., also as part of step S2120) that there is no transmission opportunity to wait for. The UE may then initiate S2130 a RACH procedure for entering the connected state using said next RACH resources. In particular, this which may include using said next RACH resources for transmitting the first transmission of the RACH procedure (e.g., Msg1 or MsgA).

It is noted that, in case of a CG based SDT procedure, the determination step S2120 may include determining whether the next RACH resource is earlier (or, alternatively, not later) than the next CG resource.

In other words, if the non-SDT traffic arrives when the UE is configured with CG resources for SDT transmission, the UE may send the non-SDT traffic indication to the scheduling device in (some of the) CG resources, or initiate the legacy RRC resume procedure, depending on which one has shorter delay.

Alternatively, a delay threshold can be signalled to the UE. The UE may then compare the delay threshold with the time until the next CG resource and make a decision accordingly. For instance, the UE may determine that the next CG resource is a transmission opportunity to wait for, if the time till said CG resource is smaller than (alternatively, not larger) said delay threshold (even if the delay to the next RACH resource is smaller than delay to said CG resource). In other words, the UE may determine that the next CG resource(s) are a transmission opportunity to wait for if at least one of the following applies: i) the next CG resource(s) are earlier (alternatively, not later) than the next RACH resource(s); or ii) the time till said next CG resource(s) is smaller (alternatively, not larger) than the delay threshold. Accordingly, the UE may determine to start a RACH procedure for entering a connected state if both of the following applies: i) the next CG resource(s) are later (alternatively, not earlier) than the next RACH resource(s); and ii) the time till said next CG resource(s) is larger (alternatively, not smaller) than the delay threshold.

Such a delay threshold may allow to flexibly adjust the delay tolerated by the UE in view of traffic conditions, such as the probability of RACH collisions with other UEs.

If the next CG resource has the same delay as the next RACH resource (in other words, neither of the next CG resource and the next RACH resource is earlier), the UE may select the CG resource, which may have the advantage of avoiding contention with other UEs.

Non-SDT DRB Traffic Indication

The Traffic Indication indicates, to the scheduling device, that the UE has detected non-SDT DRB data, that non-SDT DRB data has arrived, and/or that that non-SDT DRB data is expected to arrive. Accordingly, both the UE and the base station understand the respective traffic indications explained further below. In particular, the UE (e.g., circuitry 1830 and/or 1835) may be able to generate and/or include the respective traffic indication into a transmission, in particular into a transmission of small data; and the base station (e.g., circuitry 1880, 1885, and/or 2036) is able to extract the traffic indication from a transmission, in particular from a small data transmission, and/or able to interpret the (extracted) traffic indication as intended by the UE.

In general, the Traffic Indication may also indicate that the UE expects that non-SDT DRB arrives (e.g., in the near future). In other words, before the actual arrival of the non-SDT data, if the UE expects such arrival, the UE may determine the arrival of the non-SDT data and also use the traffic indication to indicate the arrival to the base station.

In general, the traffic indication may be transmitted together with i) at least part of the SDT DRB data using the resources indicated by the uplink grant; and/or ii) a buffer status report (BSR) indicating an amount of the SDT DRB data (e.g., an amount that is still to be transmitted). In general, a BSR for the non-SDT DRB data may also be included in the message including the traffic indication or even be the traffic indication. However If the UE does not resume non-SDT DRBs upon triggering the SDT procedure, the UE may not be able to generate the BSR for non-SDT DRBs as the traffic from non-SDT DRBs may not reach the layer 2 buffer.

The non-SDT traffic indication is to tell the gNB the arrival of non-SDT traffic and it can be either a MAC-level or RRC-level indication as further explained below.

MAC-Level Indication of Non-SDT DRB Traffic

1. Traffic Indication by MAC Subheader

In general, the traffic indication may be signaled by a predefined value of a logical channel ID (LCID) in a MAC subheader, wherein the predefined value of the LCID indicates that the non-SDT DRB data have been detected.

Figure 25:
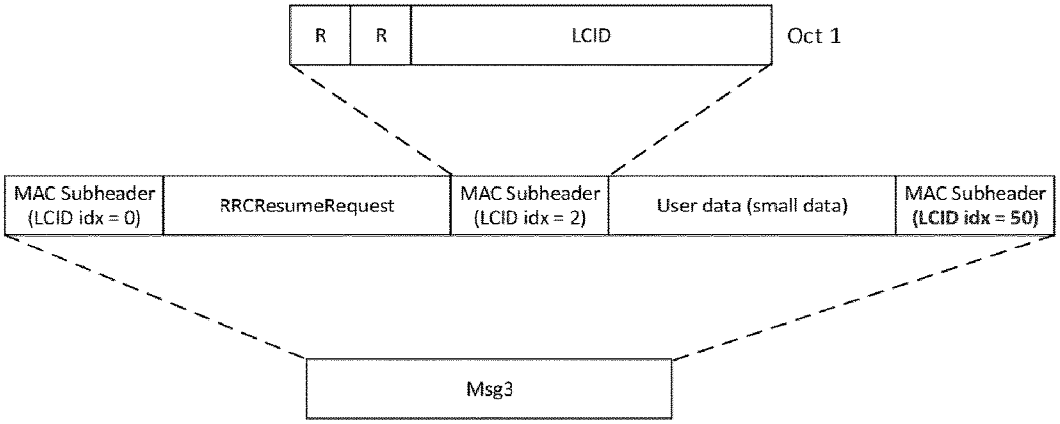
FIG. 25 shows the exemplary structure of an Msg3 message including a MAC Subframe with a Subheader indicating the arrival of non-SDT DRB and no CE.

For instance, the predefined value of the LCID, indicating the arrival of non-SDT traffic, may (further) indicate that no MAC control element (CE) is attached to the MAC subheader. This is illustrated in FIG. 25, where the traffic indication corresponds to the last MAC subheader with LCID index=50. In general, a MAC subheader with a specific LCID index (e.g., index #50, as illustrated in FIG. 25 and in Table 1 below) may be used to indicate the arrival of non-SDT traffic, without attaching a BSR MAC CE after the subheader. In other words, the MAC subframe that includes the traffic indication (i.e., the MAC subheader with said specific/predetermined LCID index) does not carry any MAC CE. For instance, said MAC subframe may consist of the MAC subheader.

Attaching no BSR MAC CE to the subheader indicating the non-SDT DRB data arrival, may allow the UE to not resume the non-SDT DRBs upon initiating the SDT procedure. More specifically, upon knowing/detecting the arrival of non-SDT data in the upper layer (e.g., SDAP layer), the UE can send already such MAC subheader to inform the arrival of non-SDT data. Since the UE doesn't need to send BSR for the non-SDT data, UE is not required to resume non-SDT DRB. Furthermore, it may reduce the overhead as a MAC subheader usually consumes only 8 bits, while BSR MAC CE consumes at least 16 bits (8 bits for the short BSR+8 bits for the subheader).

TABLE 1

(Exemplary New Entries Bold and Underlined)

| Index | LCID values |
|---|---|
| 0 | CCCH of size 64 bits (referred to as "CCCH1" in TS 38.331 [5]) |
| 1-32 | Identity of the logical channel |
| 33-**49** | Reserved |
| **50** | **Indication for the arrival of non-SDT traffic** |
| 52 | CCCH of size 48 bits (referred to as "CCCH" in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| **51** | **Short BSR + Indication for the arrival of non-SDT traffic** |
| 62 | Long BSR |
| 63 | Padding |

Alternatively, the LCID, indicating the arrival of non-SDT traffic, may (further) indicate that a BSR MAC control element (CE) is attached to the MAC subheader, wherein the BSR MAC CE indicates an amount of the SDT DRB data that is still to be transmitted.

Figure 26:
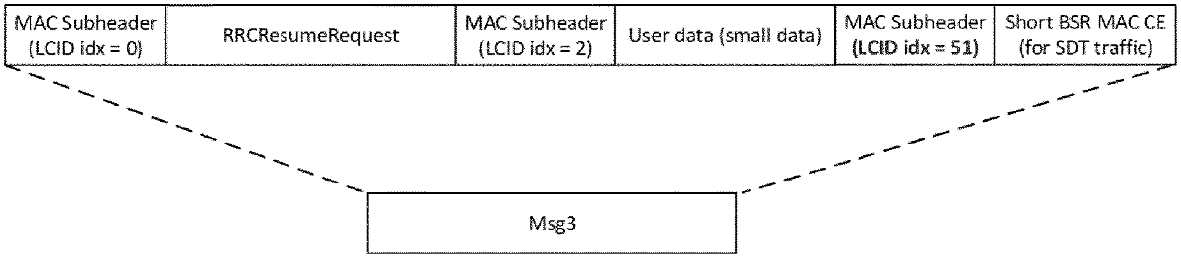
FIG. 26 shows the exemplary structure of an Msg3 message including a MAC Subframe that includes a Subheader indicating the arrival of non-SDT DRB and a CE for indicating the buffer size of SDT DRB data.

Thus, if the UE still holds some pending data for SDT DRBs when non-SDT traffic arrives, it can inform the scheduling device of such situation by using the MAC subheader with a specific LCID index number (e.g., index #51) and attaching a short BSR MAC CE after this subheader indicating the amount of remaining SDT DRB data. This is illustrated in FIG. 26, where the traffic indication corresponds to the last MAC subheader with LCID index=51. As can be seen, a Short BSR MAC CE indicating the size of remaining SDT DRB data is attached to said MAC subheader with LCID index=51.

Attaching a BSR MAC CE to a subheader indicating the non-SDT DRB data arrival facilitates the indication of the size of the remaining SDT DRB data and may allow the UE to not resume the non-SDT DRBs upon initiating the SDT procedure since the buffer size of the non-SDT DRBs is not expected to be reported.

It is noted that, alternatively, if the non-SDT DRBs are resumed upon initiating the SDT procedure, the BSR MAC CE may also be used to indicate an amount of the non-SDT DRB data that is to be transmitted.

It is further noted that in general one or both of the MAC subheaders (indicating absence and presence of an attached MAC CE) may be provided. If both are provided (e.g., defined in a standard or configured by the scheduling device), the UE may use the MAC subheader for the traffic indication that has a CE attached in order to indicate the SDT DRB buffer size, if appropriate (e.g., if the buffer size is non-zero); and may use the MAC subheader for the traffic indication that has no CE attached otherwise in order to reduce the overhead.

2. Traffic Indication by MAC Control Element

In general, the traffic indication may be part of MAC control element (CE). For instance, one bit of the MAC CE indicates whether or not the non-SDT DRB data have been detected; two bits of the MAC CE indicate a logical channel group (LCG) of the SDT DRB data among LCGs that support transmission of data in the inactive state; and five bits of the MAC CE indicate an amount of the SDT DRB data corresponding to the indicated LCG that is still to be transmitted.

Figure 27:
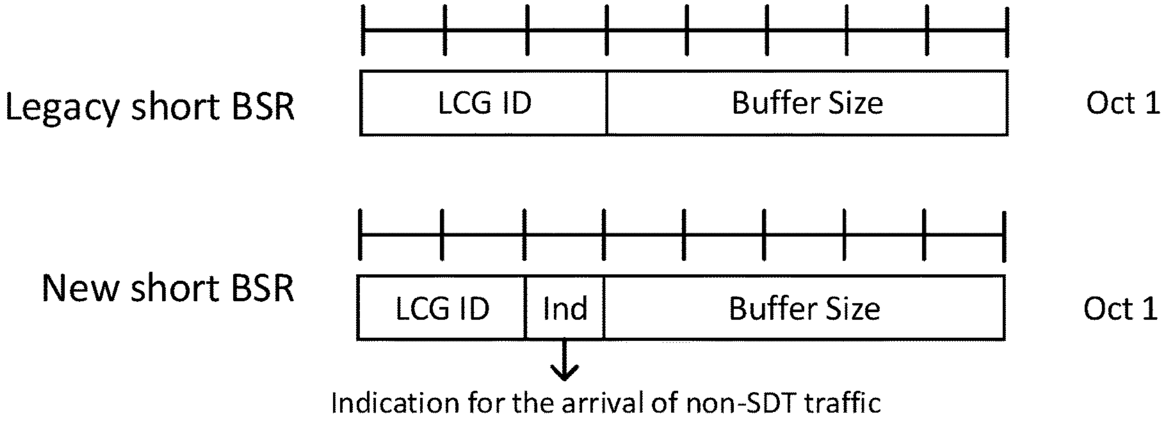
FIG. 27 shows (top row) the exemplary structure of an MAC CE for indicating the buffer size of a logical channel group as well as (bottom row) the exemplary structure of an MAC CE for indicating the buffer size of a logical channel group and for indicating the arrival of non-SDT DRB data.

In other words, when reporting the buffer status for the SDT DRBs, a new BSR MAC CE may be used to indicate the arrival of the non-SDT DRB data. Such an exemplary new MAC CE is illustrated in FIG. 27. More specifically, the upper row of FIG. 27 illustrates a Legacy short BSR, and the lower row the exemplary MAC CE including the traffic indication. As can be seen from FIG. 27, the legacy short BSR MAC CE comprises 8 bits, wherein 3 bits (in FIG. 27, the first 3 bits) are used to indicate the LCG ID and 5 (other) bits (in FIG. 27, the last 5 bits) are used to indicate the buffer size. Here, it is to be noted that each SDT DRB will usually map to one LCG (many-to-one mapping is possible), and such mapping is configured by gNB.

The new BSR MAC CE differs from the legacy short BSR MAC CE in that the new BSR MAC CE uses only 2 bits (in FIG. 27, the first two bits) to indicate which LCG the UE is reporting (in FIG. 27, the first two bits). For instance, some LCGs may be suspended and only some may be active. In other words, the maximum number of active LCGs an UE can have in RRC_INACTIVE may be 4. Accordingly, the new BSR MAC CE may only be used to indicate the buffer size of LCGs that support transmission of data in the inactive state. In other words, in the new BSR MAC CE it is exploited that a BSR for suspended LCGs/DRBs may not be possible (as the traffic will not flow to L2 buffer) by reducing the number of bits used for indicating the LCG and reusing the freed-up bits.

Furthermore, the new BSR MAC CE still uses 5 bits (in FIG. 27, the last 5 bits) to report the buffer size and uses the remaining 1 bit (in FIG. 27, the third bit) to indicate the arrival of non-SDT DRB. It is noted that the order of the bits shown in FIG. 27, in particular the position of the bit indicating the non-SDT traffic, is only exemplary. For instance, the position of the bit indicating the non-SDT traffic may be at any other position, e.g., at the first or the last (eighth) position.

Using such a new BSR MAC CE may reduce the signaling overhead as the new format can report the BSR of the SDT DRB data as well as the arrival of non-SDT traffic. It may also allow the UE to not resume the non-SDT DRBs upon initiating the SDT procedure as a BSR for the inactive LCG is not expected.

RRC-Level Indication

In general, the traffic indication may be a Radio Resource Control (RRC) level indication. This RRC-level indication may be, e.g., be carried in a new UL DCCH message. For instance, the new DCCH message can be similar to RRCReestablishmentComplete, which is an almost empty message. Such an exemplary UL-DCCH-message is given below (new information element bold and underlined). A message type indNonSDTDRBArrival has been introduce for signaling the indication of the non SDT DRB data arrival.

```
UL-DCCH-Message ::=                  SEQUENCE {
message                              UL-DCCH-MessageType
}
UL-DCCH-MessageType ::=              CHOICE {
c1                                   CHOICE {
measurementReport                    MeasurementReport,
rrcReconfigurationComplete           RRCReconfigurationComplete,
rrcSetupComplete                     RRCSetupComplete,
rrcReestablishmentComplete           RRCReestablishmentComplete,
rrcResumeComplete                    RRCResumeComplete,
securityModeComplete                 SecurityModeComplete,
securityModeFailure                  SecurityModeFailure,
ulInformationTransfer                ULInformationTransfer,
locationMeasurementIndication        LocationMeasurementIndication,
ueCapabilityInformation              UECapabilityInformation,
counterCheckResponse                 CounterCheckResponse,
ueAssistanceInformation              UEAssistanceInformation,
failureInformation                   FailureInformation,
ulInformationTransferMRDC            ULInformationTransferMRDC,
scgFailureInformation                SCGFailureInformation,
scgFailureInformationEUTRA           SCGFailureInformationEUTRA,
indNonSDTDRBArrival                  INDNonSDTDRBArrival
},
messageClassExtension                SEQUENCE { }
}
```

The INDNonSDTDRBArrival message in this example does not have any particular information elements, apart from the formal description below, which is very similar to the RRCReestablishmentComplete message specified in TS 38.331 (v15.12.0). When the message is present (received), it indicates that

```
INDNonSDTDRBArrival ::=              SEQUENCE {
rrc-TransactionIdentifier              RRC-TransactionIdentifier,
criticalExtensions                     CHOICE {
indNonSDTDRBArrival                    INDNonSDTDRBArrival-Ies,
criticalExtensionsFuture               SEQUENCE { }
}
}
INDNonSDTDRBArrival-Ies ::=          SEQUENCE {
lateNonCriticalExtension               OCTET STRING          OPTIONAL,
nonCriticalExtension                   SEQUENCE { }          OPTIONAL
}
```

UE Criteria for Multiplexing

If non-SDT DRBs are also resumed upon initiating the SDT procedure, the BSR reporting of the non-SDT traffic is also possible. In this case, upon receiving an UL grant for the transmission of SDT DRB data, a UE can choose to use the resources indicated by the UL grant to transmit one or more of the following:

- User data from the SDT DRB (e.g., SDT DRB data);
- BSR of the SDT traffic (e.g., size of the SDT DRB data that is still to be sent);
- in case of the detection/arrival of non-SDT DRB data, an arrival indication of the non-SDT DRB (e.g., a traffic indication); and
- in case of the detection/arrival of non-SDT DRB data, BSR of the non-SDT traffic (e.g., size of the non-SDT DRB data that arrived/has been detected).

The choosing criteria can be based on a priority comparison (between SDT and non-SDT traffic) and the grant size. It is noted that, if a BSR for the non-SDT data is transmitted, an additional traffic indication indicating the arrival of the non-SDT data may not be necessary. Furthermore, it is noted that, if all the SDT DRB data are sent using the resources indicated by the present UL grant, a BSR for the SDT data may not be necessary.

Thus, in general, if the resources indicated by the UL grant are sufficient, the UE may transmit the complete user data and the BSR of the non-SDT data. If, on the other hand, the resources indicated by the UL grant are not sufficient to transmit the complete user data and the BSR of the non-SDT data:

- if the priority of the non-SDT data is higher than the priority of the SDT data, the UE may determine that the resources indicated by the UL grant are to be used for transmitting a BSR for the non-SDT data, a BSR for the SDT data and part of the SDT (in this order of priority); and
- If the priority of the SDT data is higher than the priority of the non-SDT data, the UE may determine that the resources indicated by the UL grant are used to transmit a traffic indication and the complete SDT data, or.
  - if the resources are not sufficient to transmit the traffic indication and the complete SDT data, a traffic indication, a BSR for the SDT data and part of the SDT data.

For instance, if the size of the user data (including subheader) is 88 bits, the size of each of the BSRs (including subheader) is 16 bits, and the arrival indication of the non-SDT traffic is 8 bits, the UE may choose to transmit:

- If the grant has a size of 100 bits and the non-SDT traffic has a higher priority than the SDT traffic, the UE may transmit the BSR for SDT traffic (16 bits), the BSR for the non-SDT traffic (16 bits), and 68 bits of the user data (the user data may be segmented and 68 bits of the user data are sent). Thus, the UL grant is used to send 100 bits.
- If the grant has a size of 100 bits and the SDT traffic has higher priority than non-SDT traffic, the UE may transmit the complete user data (88 bits) and the arrival indication of the non-SDT DRB (8 bits). Thus, the UL grant is used to send 96.
- If the grant size is 110 bits and SDT traffic has higher priority than non-SDT traffic, the UE may transmits the complete user data and the BSR of the non-SDT traffic. Thus, the UL grant is used to send 104 bits.

Using the grant according the priority as explained above, may facilitate an efficient usage of the granted resources.

Handling of SDT Traffic Configured with RA-SDT

The above-described handling of the arrival of non-SDT traffic during an ongoing SDT procedure may also be applied to traffic associated with LCH restriction. In particular, it may be applied to the arrival/detection of RA-SDT traffic during an ongoing transmission of CG-SDT traffic. In other words, in case that the ongoing SDT procedure is an ongoing CG procedure for transmitting small data, the arrival of CG-SDT traffic can be managed in a similar manner as the arrival of non-SDT traffic. In particular, the UE may send a traffic indication indicating the arrival/detection of the RA-SDT traffic to the scheduling device. For instance, the UE may signal to the gNB with a traffic indication upon arrival of SDT traffic for LCHs that are not associated with CG-SDT procedure. Such traffic indications are for telling the gNB the arrival of traffic that is only configured with RA-SDT. The UE may initiate a RA-SDT procedure if the CG-SDT resource is not received or is not expected to be received. In other words, the RA-SDT traffic assumes the role of the non-SDT traffic of the above-described embodiments. For instance, the arrival/detection of the non-SDT traffic corresponds to the arrival/detection of the RA-SDT traffic, and the traffic indication send by the UE indicates the arrival of the RA-SDT data rather than the arrival of the non-SDT data.

The main difference is that both data (the data of the ongoing transmission as well as the newly detected data) are to be transmitted in the inactive state. In consequence, if there is no transmission opportunity to wait for, instead of initiating S2130 the RACH procedure in order to enter the connected state, the UE will start a RA procedure for transmitting, using RA resources (e.g., the RA resources associated with the second logical channel) while staying in the inactive state, the RA-SDT traffic. Furthermore, in response to reception to the traffic indication, the scheduling device will now provide the UE with one or more grant for transmission of the RA-SDT data without transitioning the UE to the connected state.

In the following, this is explained in more detail. However, not everything said above for the case of non-SDT data is repeated here for the case of the arrival of RA-SDT data. Regarding this, it is noted that, apart from the just-described difference, everything said above with respect to the handling of the arrival of "non-SDT data" may be applied to the present handling of the arrival of "RA-SDT data," e.g., by replacing the term "non-SDT data" with the term "RA-SDT data." unless the context indicates otherwise.

In particular, as shown in FIG. 28 (left-hand side), according to an exemplary embodiment, a user equipment (UE) 2810 is provided. The UE 2810 comprises a transceiver 2820 and circuitry 2830. The circuitry 2830 (e.g., circuitry 2835), in operation, detects, while in a procedure for transmitting, in an inactive state, first data for a rust logical channel, that second data for a second logical channel are to be transmitted in the inactive state. The procedure for transmitting the first data is a configured grant (CG) procedure for transmitting the first data, and the second logical channel is: (i) not configured with CG resources for transmissions in the inactive state, and (ii) configured with random access, RA, resources for transmissions in the inactive state. The circuitry 2830, in operation, determines whether or not there is a transmission opportunity to wait for. The transmission opportunity is a transmission opportunity (i) for transmitting at least part of the first data, and (ii) expected to occur as part of the procedure for transmitting the first data. When it is determined that there is no transmission opportunity to wait for or the transmission opportunity to wait for is no longer expected to occur, the circuitry 2830, in operation, a RA procedure for transmitting the second data using the RA resources. When it is determined that there is the transmission opportunity to wait for and said transmission opportunity occurs, the circuitry 2830, in operation, controls the transceiver 2820 to transmit, using said transmission opportunity, a traffic indication indicating the detection of the second data.

FIG. 29 shows an exemplary functional structure of the circuitry 2830, i.e., the circuitry handling the arrival of RA-SDT data. As shown, the arrival of RA-SDT data handling traffic indication handling circuitry 2830 may include a RA-SDT data detection circuitry 2936 and a transmission opportunity judging circuitry 2937. More specifically, circuitry 2936 detects RA-SDT data, e.g., by detecting or determining whether or not there is RA-SDT data that is to be transmitted. Circuitry 2936 may also determine whether or not the arrival of RA-SDT is expected. The transmission opportunity judging circuitry 2937 may determine whether or not there is a transmission opportunity to wait for. Additionally, if it determines that there is a transmission opportunity to wait for, circuitry 2937 may also determine the transmission opportunity to wait for (e.g., the resources of said transmission opportunity).

Figure 31:
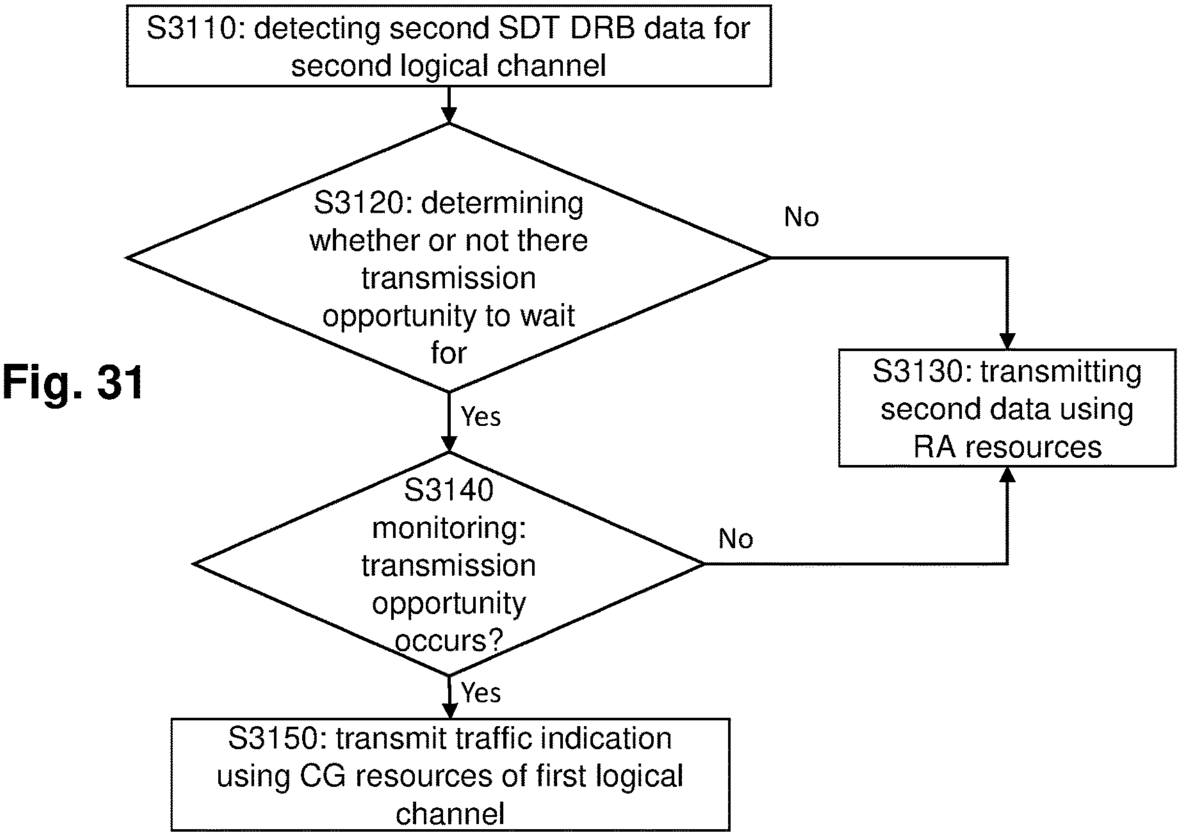
FIG. 31 is a flow chart illustrating exemplary steps performed by a user equipment.

In correspondence with the above described UE, according to another exemplary embodiment, a communication method to be performed by a UE is provided. As shown in FIG. 31, the method comprises the steps of:

- detecting S3110, while in a procedure for transmitting, in an inactive state, first data for a first logical channel, that second data for a second logical channel are to be transmitted in the inactive state;
- determining S3120 whether or not there is a transmission opportunity to wait for;
- when it is determined S3120 that there is no transmission opportunity to wait for or the transmission opportunity to wait for is no longer expected to occur (No in S3140), initiating S3130 a RA procedure for transmitting the second data using the RA resources; and
- when it is determined S3120 that there is the transmission opportunity to wait for and said transmission opportunity occurs (Yes in S3140), transmitting S3150, using said transmission opportunity, a traffic indication indicating the detection of the second data.

As also shown in FIG. 28 (right-hand side), according to another exemplary embodiment, a scheduling device 2860 is provided. The scheduling device 2860 comprises a transceiver 2870 and a circuitry 2880. The circuitry 2880, in operation, controls the transceiver 2870 to receive, from a user equipment (UE) in an inactive state, a transmission including first data for a first logical channel. The circuitry 2880, in operation, obtains, from the received transmission including the first data, a traffic indication. The traffic indication indicates the detection, by the UE, of second data for a second logical channel. The second data are data to be transmitted by the UE in the inactive state, the traffic indication is signaled by a predefined value of a logical channel ID (LCID) in a MAC subheader, and the predefined value of the LCID indicates that the second data have been detected.

FIG. 30 shows an exemplary functional structure of the traffic indication handling circuitry 2885. In particular, the traffic indication handling circuitry 2885 may include a traffic indication evaluation circuitry 3036 and a scheduling circuitry 3037. Circuitry 3036 may be responsible for obtaining and interpreting the traffic indication from the transmission including the small data. Furthermore, when circuitry 3036 obtains a traffic indication from the received transmission, circuitry 3037 may be responsible for sending, to the UE, a grant for transmission of the RA-SDT data (i.e., the "second data").

Figure 32:
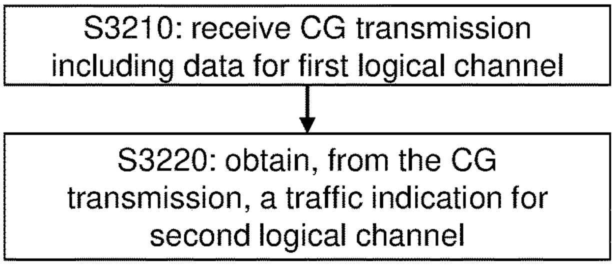
FIG. 32 is a flow chart illustrating exemplary steps performed by a network node.

Furthermore, in correspondence with the above described base station, a communication method to be performed by a scheduling device is provided. As shown in FIG. 32, the method comprising the steps of:

- receiving S3210, from a UE in an inactive state, a transmission including first data for a first logical channel; and
- obtaining S3220, from the transmission including the first data, a traffic indication indicating the detection, by the UE, of second data for a second logical channel, wherein i) the second data are data to be transmitted by the UE in the inactive state, ii) the traffic indication is signaled by a predefined value of a logical channel ID (LCID) in a MAC subheader, and iii) the predefined value of the LCID indicates that the second data have been detected.

It is noted that, as in case of the arrival of non-SDT data, the transmission opportunity to wait for refers to a transmission opportunity (i) for transmitting at least part of the first data, and (ii) that is expected to occur as part of the procedure for transmitting the first data.

Here, it should be noted that the terms RA-SDT traffic and RA-SDT data refer respectively to traffic and data for a logical channel (here, also referred to as second logical channel) that is (i) not configured with CG resources for transmissions in the inactive state, and configured with random access (RA) resources for transmissions in the inactive state. In particular, a second logical channel (LCH) may be configured and/or associated only with RA resources for transmission in the inactive state. It is noted that, RA-SDT data is also referred to as second data. It is noted that the RA resource for transmitting data in the inactive state may be different or the same as the RACH resources for entering the active state (e.g., for sending msg1).

The terms CG-SDT traffic and CG-SDT data refer respectively to traffic and data for a logical channel (here, also referred to as first logical channel) that is configured with CG resources for transmissions in the inactive state. It is noted that, RA-SDT data is also referred to as first data. It is noted that the first LCH may be configured with RA resources or not be configured with RA resources. However, the present embodiments are concerned with the case that the procedure for transmitting the first data is a configured grant (CG) procedure for transmitting the first data.

Figure 33:
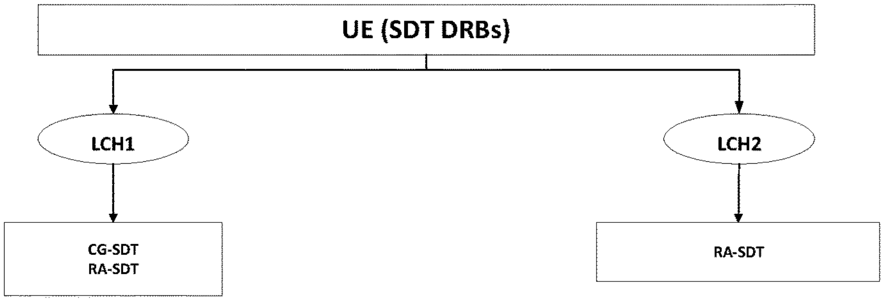
FIG. 33 illustrates exemplary logical channel configurations of an UE.

In general, a UE may be configured, with a plurality of logical channels (LCHs). A LCH may be configured with RA-SDT resources for transmissions in an inactive state and/or with CG-SDT resources for transmissions in an inactive state. For instance, a LCH may be configured with either (i) RA-SDT or (ii) CG-SDT and RA-SDT. This is illustrated in FIG. 33, where the UE is configured with two logical channels, denoted as LCH1 and LCH 2, respectively. As shown, LCH1 is configured with CG-SDT and RA-SDT, whereas LCH2 is configured only with RA-SDT. If traffic for LCH1 is available, the UE may send traffic through CG-SDT if CG-SDT criteria is met. Otherwise, if the criteria are not met, the UE may send traffic through RA-SDT. If, on the other hand, traffic for LCH2 is available, the UE may send traffic only through RA-SDT. In general, LCH restrictions may also be applied, re-using existing signalling. It may be up to the gNB how restrictions are configured. In other words, the base station may configure each LCH with RA-SDT and/or CG-SDT.

As already mentioned above, the traffic indication, the determination of whether or not there is a transmission to wait for, as well as other aspects of the handling of the arrival of RA-SDT traffic during an ongoing CG-SDT procedure are substantially similar to the corresponding aspect described above for the handling of non-SDT traffic arrival. In particular:

In general, if a next resource of the CG procedure is earlier than a next RA resource of the RA resources, it may be determined S3120 that there is a transmission opportunity to wait for. The traffic indication may then be transmitted using said transmission opportunity. Furthermore, if the next resource of the CG procedure is later than the next RA resource, the circuitry may determine S3120 that there is no transmission opportunity to wait for and may initiate S3130 the RA procedure for transmitting the second data using the RA resources. In other words, the UE may send the traffic indication to the gNB in the CG resource, or initiate the RA-SDT procedure, depending on which one has shorter delay.

However, the present invention is not limited thereto as, in general, the UE may also determine (S2920) whether or not there is a transmission opportunity to wait for based on a comparison of a time until a next resource of the CG procedure with a delay threshold value. In other words, a delay threshold can be signalled to the UE for UE to compare with the time until the next CG resource and make a decision based on the result of the comparison. For instance, the UE may determine to wait for a transmission opportunity if the time until said transmission opportunity is smaller than or equal to the threshold value, and/or determine not to wait for said transmission opportunity if the time until said transmission opportunity is greater than the threshold value. However, if the time until said transmission opportunity is equal to the threshold value, the UE may also determine not to wait. Furthermore, in general, the UE may also take other criteria into account when determining whether or not to wait for a transmission opportunity. Such a threshold value may be signalled by the gNB, may be preconfigured, or predetermined.

In particular, the traffic indication may include an indication indicating an amount of the second data and/or indication indicating an amount of the first data that is still to be transmitted. In other words, as already explained above for the handling of the arrival of the non-SDT data, a traffic indication may further contain a buffer status report.

Furthermore, as for the case of arrival of non-SDT data, also in the case of arrival of RA-SDT data, the traffic indication may be a Radio Resource Control (RRC) and/or a medium access control (MAC) level indication. In particular, as already explained with respect to FIG. 25 to 27, the traffic indication may be signaled in a MAC subheader by a predefined value of a logical channel ID (LCID) in the MAC subheader, which indicates that the second data have been detected. For instance, a MAC subheader with a specific LCID index (e.g., index #49) may be used to indicate the arrival of traffic, with/without attaching a BSR MAC CE.

Regarding this, it is noted that the UE (e.g., circuitry 2830) may determine whether or not to attach, to the MAC subheader, a BSR MAC CE indicating (i) an amount of the first second data that is still to be transmitted, and/or (ii) an amount of the second data. This determination may, e.g., depending on the size of the configured grant. More specifically, the UE may determine to attach a BSR if the CG resources of a transmission opportunity is larger than or equal to a threshold value, and/or determine not to attach the BSR if the size of the transmission opportunity is smaller than the threshold value. In particular, the just-mentioned threshold value may correspond to the size of the BSR. In other words, the BSR(s) may be included if otherwise the size of the unused part of the configured grant would be larger than or equal to the BSR(s). More specifically, the UE may thus include the BSR(s) if the size of the configured grant (i.e., the transmission opportunity used for transmitting the traffic indication) is enough to carry it. Here "enough" may, e.g., mean that the size of the configured grant is sufficient for transmitting (i) the data of the first logical channel to be sent, (ii) the traffic indication as well as (iii) the BSR(s) of the first and/or second data. The data of the first logical to be sent may, e.g., be the currently available data of the first logical channel, the data of the first logical channel that the UE determined for transmission using said grant, and/or the data of the first logical channel that should be send in view of, e.g., QoS considerations of a service associated with the first logical channel.

However, the present invention is not limited thereto as, in general, the predefined value of the LCID may indicate that no MAC control element (CE) is attached to the MAC subheader. However, in general, the LCID may also indicate that a buffer status report (BSR) MAC control element (CE) is attached to the MAC subheader, wherein the BSR MAC CE indicates an amount of the first data that is still to be transmitted. Alternatively or in addition, the LCID may indicate that a BSR MAC CE, indicating an amount of the second data, is attached to the MAC subheader.

It is also noted that also in the case of arrival of RA-SDT data, the traffic indication may be part of a medium access control (MAC) control element (CE) wherein (i) one bit of the MAC CE may indicate whether or not the second data have been detected; (ii) two bits of the MAC CE may indicate a logical channel group (LCG) of the first data among LCGs that support transmission of data in the inactive state; and (iii) five bits of the MAC CE may indicate an amount of the second data. Alternatively, as already explained above for the case of the arrival of non-SDT DRB data, the five bits may indicate an amount of the first data that is still to be transmitted.

Advantages of RA-SDT Traffic Handling

Figure 34:
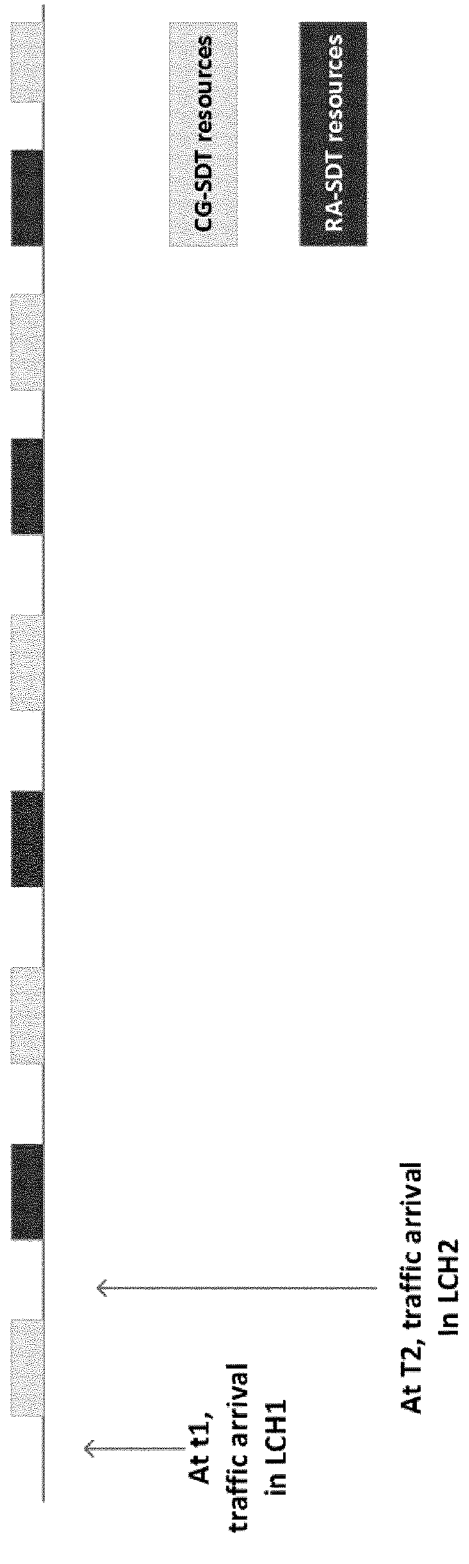
FIG. 34 is a schematic drawing illustrating the arrival of RA-SDT traffic.
Figure 35:
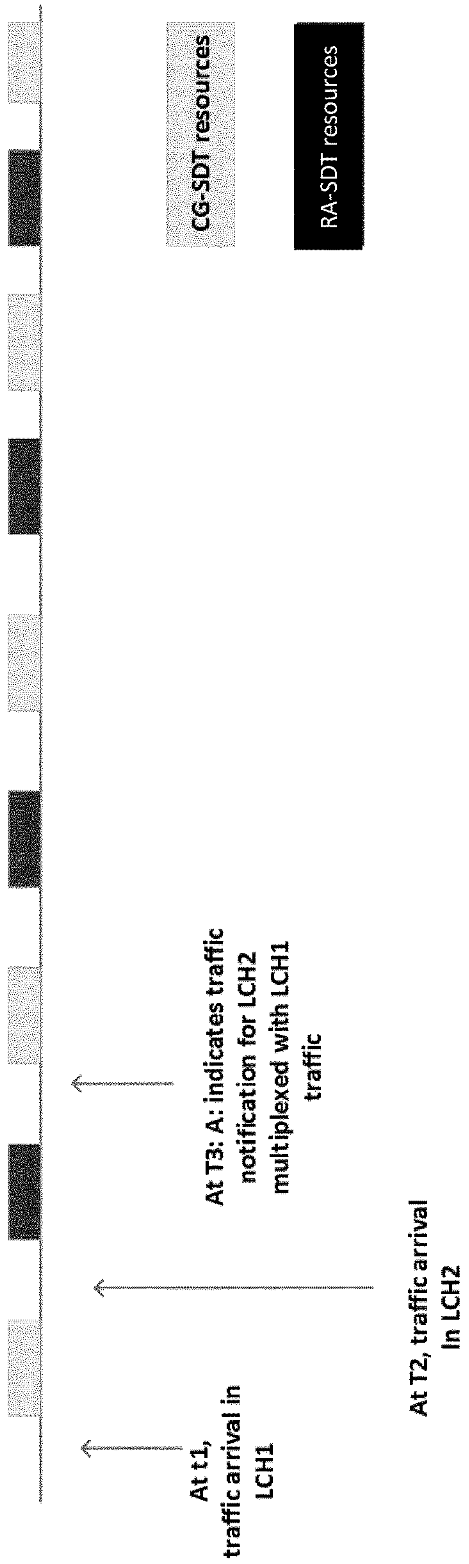
FIG. 35 is a schematic drawing illustrating exemplary handling of the arrival of RA-SDT traffic.

The above described handling of the arrival of RA-SDT data during an ongoing CG-SDT procedure may reduce the overhead, reduce the power consumption, and may prevent an RA-SDT procedure from affecting the CG-SDT transmission ongoing for LCH1. More specifically, the UE's signaling overhead may increase if it triggers RA-SDT while the CG-SDT procedure is already ongoing as shown in FIG. 34. As illustrated, traffic may be available for LCH1 that needs to transmit periodically through CG resources. During subsequent transmission for LCH1, traffic becomes available for LCH2. However, LCH2 is not mapped to CG configuration. If the UE triggers RA-SDT to transmit the data for LCH2, which is not configured with CG resources, the UE's signaling overhead would increase as well as the ongoing CG-SDT transmission for LCH1 may be affected (e.g., since a UE may not be able to handle a CG-SDT and a RA-SDT procedure at the same time). However, according to the above disclosure, a traffic indication of LCH2 traffic may be sent in the next CG resources (e.g., multiplexed with the LCH1 data) when traffic becomes available for LCH2 as shown in FIG. 35. In this way, the UE may avoid to trigger RA-SDT procedure which may be beneficial for the UE's signaling overhead as well as power consumption perspective.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g. laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Furthermore, the various embodiments may also be implemented by means of software modules, which are executed by a processor or directly in hardware. Also a combination of software modules and a hardware implementation may be possible. The software modules may be stored on any kind of computer-readable storage media. In particular, according to another implementation, a non-transitory computer-readable recording medium is provided. The recording medium stores a program which, when executed by one or more processors, causes the one or more processors to carry out the steps of a method according to the present disclosure.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

It should be further noted that the individual features of the different embodiments may individually or in arbitrary combination be subject matter to another embodiment. It would be appreciated by a person skilled in the art that numerous variations and/or modifications may be made to the present disclosure as shown in the specific embodiments. The present embodiments are, therefore, to be considered in all respects to be illustrative and not restrictive.

Further Aspects

According to a first aspect, a user equipment (UE) is provided. The UE comprises a transceiver and circuitry. The circuitry, in operation, detects, while in a procedure for transmitting first data in an inactive state, that second data are to be transmitted in a connected state. The circuitry, in operation, determines whether or not there is a transmission opportunity to wait for, wherein the transmission opportunity to wait for is i) a transmission opportunity for transmitting at least part of the first data, and ii) expected to occur as part of the procedure for transmitting the first data. When it is determined that there is no transmission opportunity to wait for or the transmission opportunity to wait for is no longer expected to occur, the circuitry, in operation, initiates a random access channel, RACH, procedure for entering a connected state. When it is determined that there is the transmission opportunity to wait for and said transmission opportunity occurs, the circuitry, in operation, controls the transceiver to transmit, using said transmission opportunity, a traffic indication indicating the detection of the second data.

According to a second aspect provided in addition to the first aspect, the procedure for transmitting the first data is a procedure initiated in a RACH procedure; and the transmission opportunity to wait for i) is a first transmission of the RACH procedure, ii) has been indicated by an uplink grant received as part of the RACH procedure, or iii) has been indicated by an uplink grant received for transmitting the first data after completion of the RACH procedure.

According to a third aspect provided in addition to the first aspect, the procedure for transmitting the first data is a procedure initiated in a RACH procedure; and i) the circuitry, in operation, determines that there is no transmission opportunity to wait for after it has controlled the transceiver to transmit the first data, or ii) the transmission opportunity to wait for is expected to be indicated by an uplink grant, wherein the uplink grant is expected to be received as part of the RACH procedure, or for transmitting part of the first data after completion of the RACH procedure.

According to a fourth aspect provided in addition to the first aspect, the uplink grant is expected to be received after the circuitry has controlled the transceiver to i) transmit a first transmission of the RACH procedure, ii) transmit a buffer status report, BSR, indicating an amount of the first data that is still to be transmitted; and/or iii) transmit, after transmitting the BSR, part of the first data, wherein an amount of the part of the first data is smaller than an amount indicated by the BSR.

According to a fifth aspect provided in addition to the third or fourth aspect, the transmission opportunity to wait for is no longer expected to occur when: the expected uplink grant has not been received and is no longer expected to be received; and the expected uplink grant is no longer expected to be received if i) the transceiver receives an indication indicating termination of the procedure for transmitting the first data; and/or ii) a predetermined time has elapsed since a first or previous transmission of at least part of the first data.

According to a sixth aspect provided in addition to one of the first to the fifth aspect, the traffic indication is transmitted together with i) at least part of the first data using the resources indicated by the uplink grant; and/or ii) a buffer status report, BSR, indicating an amount of the second data.

According to a seventh aspect provided in addition to one of the first to the sixth aspect, the RACH procedure is a 4-step RACH or a 2-step RACH procedure.

According to an eighth aspect provided in addition to the first aspect, the procedure for transmitting the first data is a configured grant (CG) procedure for transmitting the first data; and the circuitry, in operation i) if a next resource of the CG procedure is earlier than a next RACH resource, determines that there is a transmission opportunity to wait for and controls the transceiver to transmit, using said transmission opportunity, the traffic indication; and ii) if the next resource of the CG procedure is later than the next RACH resource, determines that there is no transmission opportunity to wait for and initiates the RACH procedure for entering the connected state.

According to a ninth aspect provided in addition to one of the first to the eighth aspect, the traffic indication is signaled by a predefined value of a logical channel ID, LCID, in a MAC subheader, wherein the predefined value of the LCID indicates that the second data have been detected.

According to a tenth aspect provided in addition to the ninth aspect, the predefined value of the LCID indicates that no MAC control element, CE, is attached to the MAC subheader.

According to a eleventh aspect provided in addition to the ninth aspect, the LCID indicates that a BSR MAC control element, CE, is attached to the MAC subheader, wherein the BSR MAC CE indicates an amount of the first data that is still to be transmitted.

According to a twelfth aspect provided in addition to one of the first to the eighth aspect, the traffic indication is part of MAC control element, CE, wherein i) one bit of the MAC CE indicates whether or not the second data have been detected; ii) two bits of the MAC CE indicate a logical channel group, LCG, of the first data among LCGs that support transmission of data in the inactive state; and iii) five bits of the MAC CE indicate an amount of the first data corresponding to the indicated LCG that is still to be transmitted.

According to a thirteenth aspect provided in addition to one of the first to the eighth aspect, the traffic indication is a Radio Resource Control, RRC, level indication.

According to an fourteenth aspect a method for a user equipment (UE) is provided. The method comprising the steps of:

detecting, while in a procedure for transmitting first data in an inactive state, that second data are to be transmitted in a connected state;

determining whether or not there is a transmission opportunity to wait for, wherein the transmission opportunity to wait for is i) a transmission opportunity for transmitting at least part of the first data, and ii) expected to occur as part of the procedure for transmitting the first data;

when it is determined that there is no transmission opportunity to wait for or the transmission opportunity to wait for is no longer expected to occur, initiating a random access channel, RACH, procedure for entering a connected state; and when it is determined that there is the transmission opportunity to wait for and said transmission opportunity occurs, transmitting, using said transmission opportunity, a traffic indication indicating the detection of the second data.

According to an fifteenth aspect a scheduling device is provided. The scheduling device comprises a transceiver; and circuitry which, in operation, controls the transceiver to receive, from a user equipment, UE, in an inactive state, a transmission including first data. The circuitry, in operation, obtains, from the transmission including the first data, a traffic indication indicating the detection, by the UE, of second data, wherein i) the second data are data to be transmitted by the UE in a connected state, ii) the traffic indication is signaled by a predefined value of a logical channel ID, LCID, in a MAC subheader, and iii) the predefined value of the LCID indicates that the second data have been detected.

According to an sixteenth aspect a method for a scheduling device is provided. The method comprises the steps of:

receiving, from a user equipment, UE, in an inactive state, a transmission including first data; and obtaining. from the transmission including the first data, a traffic indication indicating the detection, by the UE, of second data, wherein i) the second data are data to be transmitted by the UE in a connected state, ii) the traffic indication is signaled by a predefined value of a logical channel ID, LCID, in a MAC subheader, and iii) the predefined value of the LCID indicates that the second data have been detected.

According to a seventeenth aspect provided in addition to the fifteenth aspect or the sixteenth aspect, the transmission including the first data is transmitted as part of a procedure initiated in a RACH procedure.

According to an eighteenths aspect provided in to the seventeenth, the RACH procedure is a 4-step RACH or a 2-step RACH procedure.

According to a nineteenth aspect provided in addition to the fifteenth aspect or the sixteenth aspect, the transmission including the first data is transmitted as part of a procedure a configured grant, CG, procedure for transmitting the first data; and According to a twentieth aspect provided in addition to one of the fifteenth to the nineteenth aspect, the predefined value of the LCID indicates that no MAC control element, CE, is attached to the MAC subheader.

According to a twenty-first aspect provided in addition to one of the fifteenth to the nineteenth aspect, the LCID indicates that a BSR MAC control element, CE, is attached to the MAC subheader, wherein the BSR MAC CE indicates an amount of the first data that is still to be transmitted.

According to a twenty-second aspect a scheduling device is provided. The scheduling device comprises a transceiver; and circuitry which, in operation, controls the transceiver to receive, from a user equipment, UE, in an inactive state, a transmission including first data. The circuitry, in operation, obtains, from the transmission including the first data, a traffic indication indicating the detection, by the UE, of second data, wherein i) the second data are data to be transmitted by the UE in a connected state, ii) the traffic indication is part of MAC control element, CE, wherein: one bit of the MAC CE indicates whether or not the second data have been detected; two bits of the MAC CE indicate a logical channel group, LCG, of the first data among LCGs that support transmission of data in the inactive state; and five bits of the MAC CE indicate an amount of the first data corresponding to the indicated LCG that is still to be transmitted.

According to a twenty-third aspect a method for a scheduling device is provided. The method comprises the steps of:

receiving, from a user equipment, UE, in an inactive state, a transmission including first data; and obtaining, from the transmission including the first data, a traffic indication indicating the detection, by the UE, of second data, wherein i) the second data are data to be transmitted by the UE in a connected state, ii) the traffic indication is part of MAC control element, CE, wherein: one bit of the MAC CE indicates whether or not the second data have been detected; two bits of the MAC CE indicate a logical channel group, LCG, of the first data among LCGs that support transmission of data in the inactive state; and five bits of the MAC CE indicate an amount of the first data corresponding to the indicated LCG that is still to be transmitted.

According to a twenty-fourth aspect, a user equipment (UE) is provided. The UE comprises a transceiver and circuitry. The circuitry, in operation, detects, while in a procedure for transmitting, in an inactive state, first data for a first logical channel, that second data for a second logical channel are to be transmitted in the inactive state.

The procedure for transmitting the first data is a configured grant (CG) procedure for transmitting the first data. The second logical channel is (i) not configured with CG resources for transmissions in the inactive state, and (ii) configured with random access (RA) resources for transmissions in the inactive state. The circuitry, in operation, determines whether or not there is a transmission opportunity to wait for, wherein the transmission opportunity to wait for is (i) a transmission opportunity for transmitting at least part of the first data, and (ii) expected to occur as part of the procedure for transmitting the first data. When it is determined that there is no transmission opportunity to wait for or the transmission opportunity to wait for is no longer expected to occur, the circuitry, in operation, initiates a RA procedure for transmitting the second data using the RA resources. When it is determined that there is the transmission opportunity to wait for and said transmission opportunity occurs, circuitry, in operation, controls the transceiver to transmit, using said transmission opportunity, a traffic indication indicating the detection of the second data.

According to a twenty-fifth aspect provided in addition to the twenty-fourth aspect, the circuitry, in operation: (i) if a next resource of the CG procedure is earlier than a next RA resource of the RA resources, determines that there is a transmission opportunity to wait for and controls the transceiver to transmit, using said transmission opportunity, the traffic indication; and (ii) if the next resource of the CG procedure is later than the next RA resource, determines that there is no transmission opportunity to wait for and initiates the RA procedure for transmitting the second data using the RA resources.

According to a twenty-sixth aspect provided in addition to the twenty-fourth aspect, the circuitry, in operation, determines whether or not there is a transmission opportunity to wait for based on a comparison of a time until a next resource of the CG procedure with a delay threshold value.

According to a twenty-seventh aspect provided in addition to one of the twenty-fourth to the twenty-sixth aspect, the traffic indication is signaled in a medium access control (MAC) subheader by a predefined value of a logical channel ID (LCID) in a MAC subheader, wherein the predefined value of the LCID indicates that the second data have been detected.

According to a twenty-eight aspect provided in addition to the twenty-seventh aspect, the circuitry, in operation, determines whether or not to attach, to the MAC subheader, a BSR MAC CE indicating (i) an amount of the first second data that is still to be transmitted, and/or (ii) an amount of the second data.

According to a twenty-ninth aspect provided in addition to the twenty-seventh aspect, the predefined value of the LCID indicates that no MAC control element (CE) is attached to the MAC subheader.

According to a thirtieth aspect provided in addition to the twenty-seventh aspect, the LCID indicates that a buffer status report (BSR) MAC control element (CE) is attached to the MAC subheader, wherein the BSR MAC CE indicates an amount of the first data that is still to be transmitted.

According to a thirty-first aspect provided in addition to one of the twenty-fourth to the thirtieth aspect, the traffic indication includes an indication indicating an amount of the second data.

According to a thirty-second aspect provided in addition to one of the twenty-fourth aspect to the twenty-sixth aspect, the traffic indication is part of a medium access control (MAC) control element (CE) wherein (i) one bit of the MAC CE indicates whether or not the second data have been detected; (ii) two bits of the MAC CE indicate a logical channel group (LCG) of the first data among LCGs that support transmission of data in the inactive state; and (iii) five bits of the MAC CE indicate an amount of the second data.

According to a thirty-third aspect provided in addition to one of the twenty-fourth to the thirty-first aspect, the traffic indication is a Radio Resource Control (RRC), and/or a medium access control (MAC) level indication.

According to a thirty-fourth aspect, a method for a user equipment (UE) is provided. The method comprises a step of detecting, while in a procedure for transmitting, in an inactive state, first data for a first logical channel, that second data for a second logical channel are to be transmitted in the inactive state. The procedure for transmitting the first data is a configured grant (CG) procedure for transmitting the first data. The second logical channel is (i) not configured with CG resources for transmissions in the inactive state, and (ii) configured with random access (RA) resources for transmissions in the inactive state. The method further comprises a step of determining whether or not there is a transmission opportunity to wait for, wherein the transmission opportunity to wait for is (i) a transmission opportunity for transmitting at least part of the first data, and (ii) expected to occur as part of the procedure for transmitting the first data. When it is determined that there is no transmission opportunity to wait for or the transmission opportunity to wait for is no longer expected to occur, initiating a RA procedure for transmitting the second data using the RA resources. When it is determined that there is the transmission opportunity to wait for and said transmission opportunity occurs, transmitting, using said transmission opportunity, a traffic indication indicating the detection of the second data.

According to a thirty-fifth aspect, a scheduling device is provided. The scheduling device comprises a transceiver and circuitry. The circuitry, in operation. (i) controls the transceiver to receive, from a user equipment (UE) in an inactive state, a transmission including first data for a first logical channel; and (ii) obtains, from the transmission including the first data, a traffic indication indicating the detection, by the UE, of second data for a second logical channel. The second data are data to be transmitted by the UE in the inactive state, and the procedure for transmitting the first data is a configured grant (CG) procedure for transmitting the first data. The second logical channel is (i) not configured with CG resources for transmissions in the inactive state, and (ii) configured with random access (RA) resources for transmissions in the inactive state. The traffic indication is signaled by a predefined value of a logical channel ID (LCID) in a medium access control (MAC) subheader, and the predefined value of the LCID indicates that the second data have been detected.

According to a thirty-sixth aspect, a method for a scheduling device is provided. The method comprises a step of (i) receiving, from a user equipment (UE) in an inactive state, a transmission including first data for a first logical channel; and (ii) obtaining, from the transmission including the first data, a traffic indication indicating the detection, by the UE, of second data for a second logical channel. The second data are data to be transmitted by the UE in the inactive state, and the procedure for transmitting the first data is a configured grant (CG) procedure for transmitting the first data. The second logical channel is (i) not configured with CG resources for transmissions in the inactive state, and (ii) configured with random access (RA) resources for transmissions in the inactive state. The traffic indication is signaled by a predefined value of a logical channel ID (LCID) in a medium access control (MAC) subheader, and the predefined value of the LCID indicates that the second data have been detected.

Summarizing, provided are a user equipments (UEs), corresponding scheduling devices, and respective methods for UEs and a scheduling devices.

In particular, the disclosure provides a UE that comprises a transceiver and circuitry that detects, while in a procedure for transmitting first data in an inactive state, that second data are to be transmitted in a connected state. The circuitry determines whether or not there is a transmission opportunity to wait for. The transmission opportunity to wait for is i) a transmission opportunity for transmitting at least part of the first data, and ii) expected to occur as part of the procedure for transmitting the first data. When it is determined that there is no transmission opportunity to wait for or the transmission opportunity to wait for is no longer expected to occur, the circuitry initiates a random access channel (RACH) procedure for entering a connected state. When it is determined that there is the transmission opportunity to wait for and said transmission opportunity occurs, the circuitry controls the transceiver to transmit, using said transmission opportunity, a traffic indication indicating the detection of the second data.

The disclosure also provides a UE that comprises a transceiver and circuitry that detects, while in a procedure for transmitting, in an inactive state, first data for a first logical channel, that second data for a second logical channel are to be transmitted in the inactive state. More specifically, the procedure for transmitting the first data is a configured grant (CG), procedure for transmitting the first data, and the second logical channel is (i) not configured with CG resources for transmissions in the inactive state, and (ii) configured with random access (RA) resources for transmissions in the inactive state. The circuitry determines whether or not there is a transmission opportunity to wait for. The transmission opportunity to wait for is i) a transmission opportunity for transmitting at least part of the first data, and ii) expected to occur as part of the procedure for transmitting the first data. When it is determined that there is no transmission opportunity to wait for or the transmission opportunity to wait for is no longer expected to occur, the circuitry initiates a RA procedure for transmitting the second data using the RA resources. When, on the other hand, it is determined that there is the transmission opportunity to wait for and said transmission opportunity occurs, the circuitry controls the transceiver to transmit, using said transmission opportunity, a traffic indication indicating the detection of the second data.

The various embodiments described above can be combined to provide further embodiments. All of the U.S. patents. U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE), comprising:
a transceiver; and
circuitry which, in operation:
detects, while in a procedure for transmitting first data in an inactive state, that second data are to be transmitted in the inactive state;
determines whether or not there is a transmission opportunity to wait for, wherein the transmission opportunity to wait for is:
a transmission opportunity for transmitting at least part of the first data, and
expected to occur as part of the procedure for transmitting the first data;
when it is determined that there is no transmission opportunity to wait for or the transmission opportunity to wait for is no longer expected to occur, initiates a random access channel (RACH) procedure for entering a connected state; and
when it is determined that there is the transmission opportunity to wait for and the transmission opportunity occurs, controls the transceiver to transmit, using the transmission opportunity, a traffic indication indicating the detection of the second data, wherein
the traffic indication is signaled by a predefined value of a logical channel ID (LCID) in a MAC subheader, wherein
the predefined value of the LCID indicates that the second data have been detected.

2. The user equipment (UE) according to claim 1, wherein the procedure for transmitting the first data is a procedure initiated in a RACH procedure; and
the transmission opportunity to wait for:
is a first transmission of the RACH procedure,
has been indicated by an uplink grant received as part of the RACH procedure, or
has been indicated by an uplink grant received for transmitting the first data after completion of the RACH procedure.

3. The user equipment (UE) according to claim 1, wherein the procedure for transmitting the first data is a procedure initiated in a RACH procedure; and:
the circuitry, in operation, determines that there is no transmission opportunity to wait for after it has controlled the transceiver to transmit the first data, or
the transmission opportunity to wait for is expected to be indicated by an uplink grant, wherein the uplink grant is expected to be received:
as part of the RACH procedure, or
for transmitting part of the first data after completion of the RACH procedure.

4. The user equipment (UE) according to claim 3, wherein the uplink grant is expected to be received after the circuitry has controlled the transceiver to:
transmit a first transmission of the RACH procedure;
transmit a buffer status report (BSR) indicating an amount of the first data that is still to be transmitted; and/or
transmit, after transmitting the BSR, part of the first data, wherein an amount of the part of the first data is smaller than an amount indicated by the BSR.

5. The user equipment (UE) according to claim 3, wherein the transmission opportunity to wait for is no longer expected to occur when the expected uplink grant has not been received and is no longer expected to be received; and
the expected uplink grant is no longer expected to be received if:
the transceiver receives an indication indicating termination of the procedure for transmitting the first data; and/or
a predetermined time has elapsed since a first or previous transmission of at least part of the first data.

6. The user equipment (UE) according to claim 1, wherein the traffic indication is transmitted together with:
at least part of the first data using the resources indicated by the uplink grant; and/or
a buffer status report (BSR) indicating an amount of the first data.

7. The user equipment (UE) according to claim 1, wherein the RACH procedure is a 4-step RACH or a 2-step RACH procedure.

8. The user equipment (UE) according to claim 1, wherein the procedure for transmitting the first data is a configured grant (CG) procedure for transmitting the first data; and the circuitry, in operation:

if a next resource of the CG procedure is earlier than a next RACH resource, determines that there is a transmission opportunity to wait for and controls the transceiver to transmit, using the transmission opportunity, the traffic indication; and if the next resource of the CG procedure is later than the next RACH resource, determines that there is no transmission opportunity to wait for and initiates the RACH procedure for entering the connected state.

9. The user equipment (UE) according to claim 1, wherein the predefined value of the LCID indicates that no MAC control element (CE) is attached to the MAC subheader.

10. The user equipment (UE) according to claim 1, wherein the LCID indicates that a buffer status report (BSR) MAC control element (CE) is attached to the MAC subheader, wherein the BSR MAC CE indicates an amount of the first data that is still to be transmitted.

11. The user equipment (UE) according to claim 1, wherein the traffic indication is part of MAC control element (CE), wherein:

one bit of the MAC CE indicates whether or not the second data have been detected;

two bits of the MAC CE indicate a logical channel group (LCG) of the first data among LCGs that support transmission of data in the inactive state; and five bits of the MAC CE indicate an amount of the first data corresponding to the indicated LCG that is still to be transmitted.

12. The user equipment (UE) according to claim 1, wherein the traffic indication is a Radio Resource Control (RRC) level indication.

13. A method for a user equipment (UE), the method comprising the steps of:

detecting, while in a procedure for transmitting first data in an inactive state, that second data are to be transmitted in the inactive state;

determining whether or not there is a transmission opportunity to wait for, wherein the transmission opportunity to wait for is:

a transmission opportunity for transmitting at least part of the first data, and expected to occur as part of the procedure for transmitting the first data;

when it is determined that there is no transmission opportunity to wait for or the transmission opportunity to wait for is no longer expected to occur, initiating a random access channel (RACH) procedure for entering a connected state; and when it is determined that there is the transmission opportunity to wait for and the transmission opportunity occurs, transmitting, using the transmission opportunity, a traffic indication indicating the detection of the second data, wherein the traffic indication is signaled by a predefined value of a logical channel ID (LCID) in a MAC subheader, wherein the predefined value of the LCID indicates that the second data have been detected.

14. A scheduling device, comprising:

a transceiver; and circuitry which, in operation:

controls the transceiver to receive, from a user equipment (UE), in an inactive state, a transmission including first data; and obtains, from the transmission including the first data, a traffic indication indicating the detection, by the UE, of second data, wherein the second data are data to be transmitted by the UE in the inactive state, the traffic indication is signaled by a predefined value of a logical channel ID (LCID) in a MAC subheader, and the predefined value of the LCID indicates that the second data have been detected.

* * * * *